US008762215B2

(12) United States Patent
Barros et al.

(10) Patent No.: US 8,762,215 B2
(45) Date of Patent: Jun. 24, 2014

(54) BROKERED SERVICE DELIVERY

(75) Inventors: Alistair P. Barros, Camira (AU); Ingo Weber, Mannheim (DE)

(73) Assignee: SAP AG, Walldorf (DE)

( * ) Notice: Subject to any disclaimer, the term of this patent is extended or adjusted under 35 U.S.C. 154(b) by 704 days.

(21) Appl. No.: 12/263,450

(22) Filed: Oct. 31, 2008

(65) Prior Publication Data

US 2010/0114586 A1    May 6, 2010

(51) Int. Cl.
*G06Q 30/00* (2012.01)

(52) U.S. Cl.
USPC .......................................................... 705/26.1

(58) Field of Classification Search
USPC .................................... 705/26–27, 26.1–27.2
See application file for complete search history.

(56) References Cited

U.S. PATENT DOCUMENTS

| | | | |
|---|---|---|---|
| 5,394,347 A | 2/1995 | Kita et al. | |
| 5,490,097 A | 2/1996 | Swenson et al. | |
| 2003/0236677 A1 | 12/2003 | Casati et al. | |
| 2006/0085790 A1 | 4/2006 | Hintermeister et al. | |
| 2006/0106748 A1 | 5/2006 | Chafle et al. | |
| 2006/0212836 A1 | 9/2006 | Khushraj et al. | |
| 2006/0225032 A1 | 10/2006 | Klerk et al. | |
| 2007/0094211 A1 | 4/2007 | Sun et al. | |
| 2007/0150322 A1* | 6/2007 | Falchuk et al. | 705/7 |
| 2007/0208590 A1* | 9/2007 | Dorricott et al. | 705/1 |
| 2007/0226038 A1 | 9/2007 | Das et al. | |
| 2007/0245295 A1* | 10/2007 | Baum | 717/100 |
| 2007/0266377 A1 | 11/2007 | Ivanov et al. | |
| 2008/0229275 A1 | 9/2008 | Weber | |
| 2009/0055796 A1 | 2/2009 | Springborn et al. | |
| 2009/0113394 A1 | 4/2009 | Weber et al. | |
| 2009/0235252 A1 | 9/2009 | Weber et al. | |

OTHER PUBLICATIONS

Ankolekar, et al., "Towards a Formal Verification of OWL-S Process Models", in Fourth International Semantic Web Conference (ISWC 2005), 2005, pp. 1-15.
Van Der Aalst, W.M.P., et al., "Workflow Patterns", Distributed and Parallel Databases, vol. 14, No. 1, Jul. 2003, pp. 1-70.
Awad, et al., "Efficient Compliance Checking Using BPMN-Q and Temporal Logic", Proceedings of the 6th International Conference on Business Process Management, LNCS vol. 5240, 2008,16 pages.

(Continued)

*Primary Examiner* — Jeffrey Smith
*Assistant Examiner* — Ethan D Civan
(74) *Attorney, Agent, or Firm* — Brake Hughes Bellermann LLP

(57) ABSTRACT

A selected activity of a service process model displayed in a process view of a graphical user interface may be determined. The service process model may represent a software service to be provided from a service provider to a consumer by way of a service broker. At least one service delivery entity associated with the service broker and providing service delivery functionality to be included in a brokered service process model may be determined, the service delivery entity including a state machine comprising states and transitions between the states. Configuration options may be provided in a configuration view of the graphical user interface. The configuration options may include goal states of the states to be reached as part of the brokered service process model and in association with the selected activity. A selected goal state of the goal states may be determined. The brokered service process model may be provided within a brokered service process view of the graphical user interface. The brokered service process model may include at least one entity activity configured to cause the selected goal state to be reached in association with the selected activity.

20 Claims, 8 Drawing Sheets

(56) References Cited

OTHER PUBLICATIONS

Brat, et al., "Combining Static Analysis and Model Checking for Software Analysis", 16th IEEE International Conference on Automated Software Engineering (ASE'01), 2001, 8 pages.
"CRM Company Information—salesforce.com", Copyright 2000-2010, Document retrieved on Mar. 19, 2010 from http://www.salesforce.com/company,1 page.
Fu, et al., "Analysis of Interacting BPEL Web Services", Proceedings of the 13th International Conference on World Wide Web, May 17-22, 2004, 10 pages.
Fuxman, A.D., "Formal Analysis of Early Requirements Specifications", Thesis, Graduate Department of Computer Science, University of Toronto, 2001, 113 pages.
Godefroid, P., "Partial-Order Methods for the Verification of Concurrent Systems: An Approach to the State-Explosion Problem", Thesis, Universite De Liege, 1996,133 pages.
Janssen, et al., "Verifying Business Processes using SPIN", Proceedings of the 4th International SPIN Workshop, 1998, pp. 1-16.
Kovalyov, et al., "A Polynomial Algorithm to Compute the Concurrency Relation of Free-choice Signal Transition Graphs", in Proceedings of the International Workshop on Discrete Event Systems (WODES), 1995, pp. 1-13.
Kazhamiakin, et al., "Formal Verification of Requirements using SPIN: A Case Study on Web Services", Proceedings of the Second International Conference on Software Engineering and Formal Methods, 2004, 10 pages.
Liu, et al., "A Static Compliance-Checking Framework for Business Process Models", IBM Systems Journal, vol. 46, Issue 2, 2007, 34 pages.
McMillan, K L., "Symbolic Model Checking: An Approach to the State Explosion Problem", PhD Thesis, May 1992, 212 pages.
Nakajima, S., "Verification of Web Service Flows With Model-Checking Techniques", Proceedings of First International Symposium on Cyber Worlds, 2002, 8 pages.
Ribeiro, et al., "Translating Synchronous Petri Nets into PROMELA for Verifying Behavioural Properties", International Symposium on Industrial Embedded Systems (SIES 2007), 2007, pp. 266-273.
Vaz, et al., "Towards Automated Verification of Web Services", International Association for Development of the Information Society (IADIS) International Conference, Oct. 2007, 9 pages.
Vanhatalo, et al., "The Refined Process Structure Tree", The 6th International Conference on Business Process Management (BPM 2008), Sep. 2008, 24 pages.
Vanhatalo, et al., "Faster and More Focused Control-Flow Analysis for Business Process Models Through SESE Decomposition", Proceedings of the 5th international conference on Service-Oriented Computing, Sep. 17-20, 2007, 17 pages.
Van Der Aalst, W.M.P, "Verification of Workflow Nets", Proceedings of the 18th International Conference on Application and Theory of Petri Nets, Lecture Notes in Computer Science, vol. 1248, 1997, 21 pages.
Verbeek, et al., "Diagnosing Workflow Processes Using Woflan", The Computer Journal, vol. 44, 2001, pp. 1-34.
Weber, et al., "Beyond Soundness: On the Semantic Consistency of Executable Process Models", in Sixth IEEE European Conference on Web Services, Nov. 2008, 10 pages.
Winslett, "Reasoning About Action Using a Possible Models Approach", in Seventh National Conference on Artificial Intelligence, 1988, pp. 89-93.
Zhao, et al., "Towards the Formal Model and Verification of Web Service Choreography Description Language", Third International Workshop on Web Services and Formal Methods, 2006, pp. 1-16.
Ly, L. T. et al., "Semantic Correctness in Adaptive Process Management System", LNCS vol. 4102, 2006, pp. 193-208.
Bonatti, P. A. et al., "Rule-based Policy Specification: State of the Art and Future Work", Rewerse Project No. IST-2004-506779, Aug. 31, 2004,172 pages.

Drum, C. et al., "Deliverable D 3.2: Dynamic Composition Reasoning Framework and Prototype", Project IST 026850 SUPER, Semantics Utilized for Process management within and between Enterprises, Sep. 2007, 222 pages.
Weber, I. et al., "Semantic Business Process Validation", 3rd International Workshop on Semantic Business Process Management, 2008, 36 pages.
Radwan, et al., "Designing an Integrated Enterprise Model to support Partnerships in the Geo-Information Industry", Partnerships in the Geo-Information IndustryMapAsia, Retrieved on Mar. 9, 2010 from http://www.gisdevelopment.net/technology/gis/ma03111pf.htm, 2003, 11 pages.
Extended European Search Report for EP Application No. 09013749.8, mailed on Feb. 8, 2010, 7 pages.
"Information from the European Patent Office: Notice from the European Patent Office dated Oct. 1, 2007 concerning amendment of the Guidelines for Examination in the European Patent Office", Official Journal EPO, Nov. 2007, pp. 589-592.
"StrikeIron: Accurate Data. Right When You Need It.", Copyright 2003-2009, Document retrieved on Mar. 19, 2010 from http://www.strikeiron.com/Home.aspx, 3 pages.
"StrikeIron, Inc.", Copyright 2001-2008, Document retrieved on Mar. 19, 2010 from http://www.webservices.org/vendors/strikeiron_inc, 1 page.
"Security Review: Force.com AppExchange Security Review", Copyright 2000-2009, Document retrieved on Mar. 19, 2010 from http://wiki.developerforce.com/index.php/Security_Review, 2 pages.
Wainewright, P., "How is AppExchange really doing?", Software as Services, ZDNet.com, Document retrieved from http://blogs.zdnetcom/SAAS/?p=324, May 10, 2007, 3 pages.
Ricciuti, M. "Salesforce buy extends reach to mobile devices", CNET News, document retrieved on Mar. 19, 2010 from http://news.cnet.com/Salesforce-buy-extends-reach-to-mobile-devices/2100-1017_3-6059716.html, Apr. 11, 2006, 1 page.
Dustdar, Schahram et al., "D2.2 Semantic Querying, Discovery, and Composition Framework", SemBiz Distributed Systems Group Information Systems Institute Vienna University of Technology Austria; Digital Enterprise Research Institute Leopold & #8722; Franzens Universitat Innsbruck Austria, Aug. 20, 2007, pp. 1-31.
Office Action for EP Application No. 09013749.8, mailed on Feb. 15, 2011, 5 pages.
Fisteus, et al., "Applying Model Checking to BPEL4WS Business Collaborations", Proceedings of the ACM Symposium on Applied Computing, 2005, pp. 826-830.
McIlraith, et al., "Adapting Golog for Composition of Semantic Web Services", in Proceedings of the 8th International Conference on Knowledge Representation and Reasoning (KR 2002), Apr. 2002, 12 pages.
McIlraith, et al., "Semantic Web Services", IEEE Intelligent Systems, vol. 16 No. 2, Mar. 2001, pp. 46-53.
Narayanan, et al., "Simulation, Verification and Automated Composition of Web Services", Proceedings of the 11th International Conference on World Wide Web, 2002, pp. 77-88.
Rao, Jinghai et al., "A Survey of Automated Web Service Composition Methods", Lecture Notes in Computer Science, vol. 3387, Semantic Web Services and Web Process Composition, 2005, pp. 43-54.
Roman, et al, "WSMO Choreography: From Abstract State Machines to Concurrent Transaction Logic", ESWC 2008, LNCS vol. 5021, Jun. 2008, pp. 659-673.
Yan, Zhixian et al., "D3.1 SemBiz BPMSuite Requirements Analysis and Design", SemBiz, Feb. 2007, pp. 1-19.
Advisory Action for U.S. Appl. No. 11/932,730, mailed Nov. 28, 2012, 7 pages.
Final Office Action for U.S. Appl. No. 11/932,730, mailed Sep. 20, 2012, 12 pages.
Final Office Action Response and RCE for U.S. Appl. No. 11/932,730, filed Dec. 4, 2012, 3 pages.
Non-Final Office Action for U.S. Appl. No. 12/049,755, mailed Nov. 16, 2012, 20 pages.

(56) References Cited

OTHER PUBLICATIONS

Final Office Action Response for U.S. Appl. No. 11/932,730, filed Nov. 6, 2012, 19 pages.
Mendling, "Detection and Prediction of Errors in EPC Business Process Models", Dissertation, Institute of Information Systems and New Media, Vienna University of Economics and Business Administration, May 22, 2007, 362 pages.
Non-Final Office Action for U.S. Appl. No. 11/932,730, mailed May 8, 2013, 13 pages.
Weber, et al, "Approximate Compliance Checking for Annotated Process Models", Proceedings of the 1st International Workshop on Governance, Risk and Compliance—Applications in Information Systems, Jun. 17, 2008, pp. 46-60.
Advisory Action for U.S. Appl. No. 12/049,755, mailed Jun. 28, 2013, 3 pages.
Final Office Action Response for U.S. Appl. No. 12/049,755, filed Jun. 20, 2013, 12 pages.
RCE for U.S. Appl. No. 12/049,755, filed Jul. 2, 2013, 3 pages.
Result of Consultation for EP Application No. 09013749.8, mailed May 29, 2013, 5 pages.
Non-Final Office Action for U.S. Appl. No. 12/049,755, mailed Jul. 29, 2013, 18 pages.
Notice of Allowance for U.S. Appl. No. 11/932,730, mailed Oct. 11, 2013, 10 pages.
Final Office Action for U.S. Appl. No. 12/049,755, mailed Nov. 13, 2013, 20 pages.

\* cited by examiner

BROKERED SERVICE DELIVERY

TECHNICAL FIELD

This description relates to brokered service delivery.

BACKGROUND

The brokering of goods and services is a time-honored technique of facilitating commerce. In its many forms, such brokering shares a recognition that providers of goods and services are often unwilling or unable to undertake the effort needed to initiate, conduct, or consummate a transaction with one or more consumers. For example, a manufacturer of a good may prefer to focus on the manufacturing process, and may therefore contract with a broker, who may then be responsible for locating a purchaser of the manufactured good and for conducting and consummating the sale of the good with the purchaser. Of course, the broker typically receives a share of the purchase price or some other fee or payment for providing these brokering services. In this way, the manufacturer (or other provider) and the broker may concentrate on developing their respective areas of expertise.

In the computer, network, and software realm(s), brokers have adopted these general concepts for the delivery of goods and services, e.g., over the Internet. For example, brokers may provide a marketplace in which various providers may sell their respective goods and/or services. For example, a provider of a 'real-world' item such as a book (e.g., a publisher) may utilize a broker to sell copies of the book. Similarly, brokers may exist which facilitate sales of digital content (e.g., songs or movies) and/or sales of software applications, among many other items for sale.

Meanwhile, however, software has evolved from stand-alone, integrated, monolithic applications into discrete services which provide specific functionality (or which combine to provide desired functionality), often on an as-needed basis. The providing of software in this and related form(s) is often referred to as "software as a service (SaaS)" and/or as a "service oriented architecture (SOA)." For example, a service for providing seat reservations may be provided, e.g., to an airline for booking airplane seats, or to a theater for booking concert seats. Conceptually, virtually any software functionality may be provided as a service, e.g., over the Internet or other network.

In theory, the intersection of brokering and software services, then, is conceptually straight-forward. That is, software service providers (referred to herein as service providers) may be as desirous as any other provider to obtain the advantages of providing their (software) services through a broker. In some cases, such as when software is conceptually similar to discrete goods (as in the example(s) above of digital songs or movies), the implementation of brokering services is also straight-forward. Specifically, for example, a broker may obtain rights to sell the software in question, and may locate a customer for the software and otherwise conduct and consummate the sale.

In practice, however, many services are conventionally difficult or impossible to broker, at least in any standard or widely-applicable manner. For example, there may be a software service provided by a municipality or other governmental entity to potential small business owners for initiating and registering a business license of some kind. These and other similar services may be complex, long-running process(es) which execute over the course of multiple days or longer. In addition, such multi-step services may execute on back-end (e.g., legacy) applications of the service provider and may require multiple interactions/interfaces with the service provider and/or other stakeholders.

In these situations, it may be difficult for the service providers to supplement their services to make them commercially viable, or to otherwise provide their services to consumers. For example, the service provider may have particular preferences, from a business perspective, about whether, when, and how payment(s) should be received for the service. However, an attempt by the service provider to integrate payment functionality into the service in question may fail outright, or may disrupt the actual functionality of the service. For example, the service provider may wish to obtain partial payments at different points in the process, but may fail to configure a timing of these partial payments correctly with respect to the service as a whole, or may fail to ensure that the full payment is ultimately received (e.g., when the service process/interactions follow an unlikely or unexpected route).

Conversely, a service broker may be an expert at the technical aspects of adding payment functionality to the service, but may not have the specific business knowledge of the service provider with respect to the service in question. Moreover, even if the service broker were to expend the effort to modify the service to incorporate payments or other service delivery functionality, the service broker may not wish to take on the cost or effort needed to provide (e.g., host) the service directly to consumers.

As a result of the above, no satisfactory solution exists for configuring and delivering brokered services in a practical manner that leverages the relative areas of expertise of the involved parties. Consequently, service providers are less able to commercialize their services, service brokers are less capable of brokering such services, and consumers suffer a more-limited market for, and less access to, services that they may wish to use.

SUMMARY

According to one general aspect, a computer system including instructions stored on a computer-readable medium may include a view generator configured to provide a service process model displayed in a process view of a graphical user interface, the service process model representing a software service to be provided from a service provider to a consumer by way of a service broker, determine a selected activity of the service process model, provide configuration options in a configuration view of the graphical user interface, the configuration options associated with at least one service delivery entity associated with the service broker that provides service delivery functionality to be included in a brokered service process model, the service delivery entity including a state machine comprising states and transitions between the states, wherein the configuration options include goal states of the states to be reached as part of the brokered service process model in association with the selected activity, determine a selected goal state of the goal states; and provide the brokered service process model within a brokered service process view of the graphical user interface. The computer system may include a state manager configured to determine a corresponding state associated with the selected activity and to determine the goal states based thereon. The computer system may include a configuration controller configured to provide the goal states to the view generator as part of the configuration options, and configured to determine at least one entity activity to be included within the brokered service process model in association with the selected activity and configured to cause the selected goal state to be reached as part of the brokered service process model.

According to another general aspect, a computer program product for executing process models may be tangibly embodied on a computer-readable medium and may include executable code that, when executed, is configured to cause at least one data processing apparatus to determine at least one service delivery entity associated with a service broker and providing service delivery functionality to be included in a brokered service process model, the service delivery entity including a state machine comprising states and transitions between the states, determine a selected activity of a service process model to be brokered, the service process model representing a software service to be provided from a service provider to a consumer by way of the service broker, determine a corresponding state of the service delivery entity associated with the selected activity, determine goal states based on the corresponding state, determine a selected goal state of the goal states, and provide the brokered service process model including at least one entity activity configured to cause the selected goal state to be reached in association with the selected activity.

According to another general aspect, a selected activity of a service process model displayed in a process view of a graphical user interface may be determined. The service process model may represent a software service to be provided from a service provider to a consumer by way of a service broker. At least one service delivery entity associated with the service broker and providing service delivery functionality to be included in a brokered service process model may be determined, the service delivery entity including a state machine comprising states and transitions between the states. Configuration options may be provided in a configuration view of the graphical user interface. The configuration options may include goal states of the states to be reached as part of the brokered service process model and in association with the selected activity. A selected goal state of the goal states may be determined. The brokered service process model may be provided within a brokered service process view of the graphical user interface. The brokered service process model may include at least one entity activity configured to cause the selected goal state to be reached in association with the selected activity.

The details of one or more implementations are set forth in the accompanying drawings and the description below. Other features will be apparent from the description and drawings, and from the claims.

DETAILED DESCRIPTION

Figure 1:
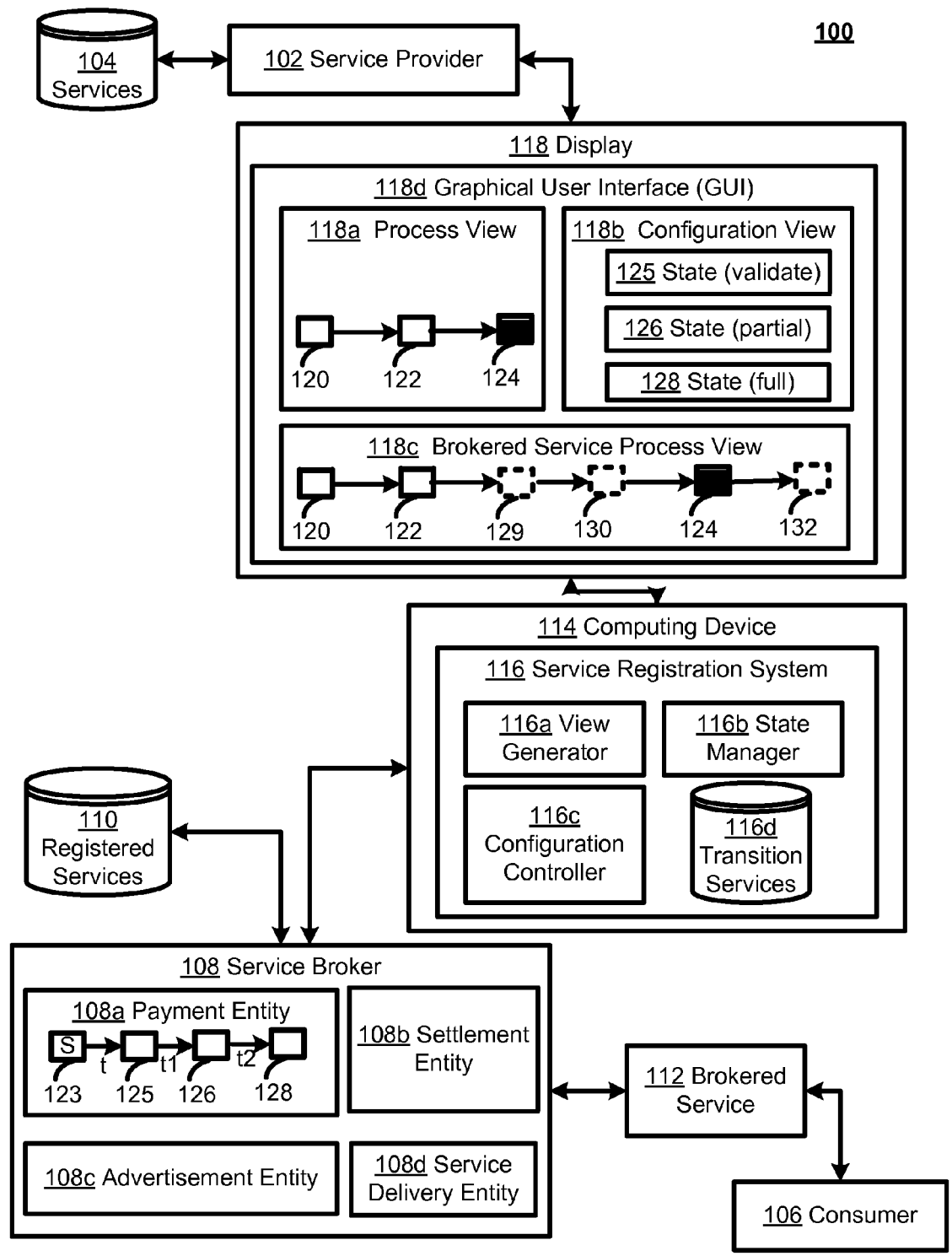
FIG. 1 is a block diagram of a system for providing brokered service delivery.

FIG. 1 is a block diagram of a system 100 for providing brokered service delivery. In the example of FIG. 1, a service provider 102 represents an owner, developer, seller, or other provider of one or more services 104 which the service provider 102 wishes to provide to one or more consumers 106. In so doing, in FIG. 1, the service provider registers the services 104 with a service broker 108, resulting in a collection of registered services 110. The service broker 108 may then practice its expertise in facilitating commerce of the registered services by providing at least one of the registered services as a brokered service 112 to the consumer 106.

In FIG. 1, a computing device 114 provides an example platform for a service registration system 116 that is used to register the services 104 to obtain the registered services 110. In particular, as described in detail below, such registration may include a configuring of the services 104 for service delivery in a manner that is standardized and widely-applicable, that ensures completeness and consistency of the configuration, and that allows the service provider 102 and the service broker 108 to practice in their respective areas of preference(s) and expertise. Thus, the service provider 102 may focus on developing and improving the services 104 while allowing the service broker 108 to be responsible for commercializing the services 104, yet may leverage its business expertise in configuring the services 104 for such commercialization (without needing particular technical expertise to do so). Meanwhile, the service broker 108 may practice in the area of commercializing the services 104 without worrying about the particular business aspects of the services 104 and without having to actually host the services 104 for provision to the consumer 106.

In more detail, the service provider 102 may represent virtually any entity wishing to sell or provide access to the services 104, including, e.g., commercial software providers, bank/financial corporations, health service providers, legal domains, or municipalities or other governmental entities. The services 104 may represent, e.g., executable code for, for example, stand-alone consumer products, such as may be provided by way of an Internet browser to a purchaser. In more specific examples, the services 104 may include, e.g., a small business creation service, a property conveyance service, or a service for ordering passports, to name a few. Alternatively, the services 104 may represent services that operate as foundational or component services that are each to be combined with other services to provide a composite functionality that is exposed to the consumer 106.

Thus, consumer 106 may represent a person, corporation, computer or other automated system, or virtually any other entity that desires to purchase or otherwise gain varying levels of access to one or more of the services 104, as, e.g., the brokered service 112. The consumer 106, of course, typically may be assumed to be uninterested in details of the operation of the system 100, and rather may simply wish to access the brokered service 112 in a desired manner (e.g., by way of an Internet browser, or as part of a search for services with desired functionality to be combined with other services to achieve a composite result).

The service broker 108 conceptually represents a service marketplace of one or more service brokers through which services, from a variety of service providers, may be registered and brokered. That is, for example, the services 104, once registered and published, may be searched, negotiated for pricing and other conditions of service usage or delivery, ordered subject to access constraints, interacted with, and ultimately paid for by the consumer 106. Thus, as referenced herein, the service broker 108 may be considered to manage the "front-desk" of services 104 including, e.g., collecting the payment(s) from the consumer 106 and disbursing transaction fees to themselves and to the service provider(s) 102 involved in a consumed service, based on agreed-upon shared revenue arrangements.

As described in detail herein, the system 100 (e.g., the service registration system 116) provides a model-based technique for lowering the entrance barrier for the service provider 102 to register services 104 with the service broker 108 as registered services 110, such that the service 104 is rapidly configured to utilize local service delivery management components (shown as 108a-108d and described in detail, below) of the service broker 108. Specifically, for example, the service broker 108 may use process modeling for supporting the execution steps of a service of the services 104, and may provide for correct configuring of the service delivery functions (e.g., payment points) that are local to the service broker 108 into the service process model. By formalizing the different operations in a service delivery function(s) (e.g., payment or settlement) and their allowable execution sequences (e.g., full payments must follow partial payments and either should first have a payment apportioned to each of the different service partners, if any), tooling support may be used to allow a non-technical user to configure service delivery functions in a consistent and complete way.

In the present context, such process modeling or workflow process modeling may be understood to refer to the use of modeling languages as meta-languages to describe and execute underlying processes, such as the services 104. For example, process modeling languages allow an enterprise to describe tasks or activities of the services 104, and to automate performance execution of those tasks in a desired order to achieve a desired result. Thus, such modeling languages allow a flow of activities or tasks to be graphically captured and executed, thereby enabling resources responsible for the activities to be coordinated efficiently and effectively, and in a repeatable, consistent manner. The flow of work in the service(s) process(es) may be captured through routing (e.g., control flow) constructs, which allow the activities in the service process(es) to be arranged into the required execution order through, for example, sequencing, choices (e.g., decision points allowing alternative branches), parallelism (e.g., activities running in different branches which execute concurrently), iteration (e.g., looping in branches) and synchronization (e.g., the coming together of different branches).

Thus, a service of the services 104 may be represented as a process model having pre-defined activities and a pre-defined order of execution of the activities, which may be exposed to the consumer 106. For purposes of brokering such a service, as referenced above, the service broker 108 may include a plurality of service delivery management components, illustrated in FIG. 1 as entities 108a-108d. That is, as described and illustrated in more detail herein, the entities 108a-108d each represent one or more discrete functionalities that the service provider 102 and/or the service broker 108 may wish to use to supplement (i.e., configure) a service of the services 104 for registration thereof.

Figure 8:
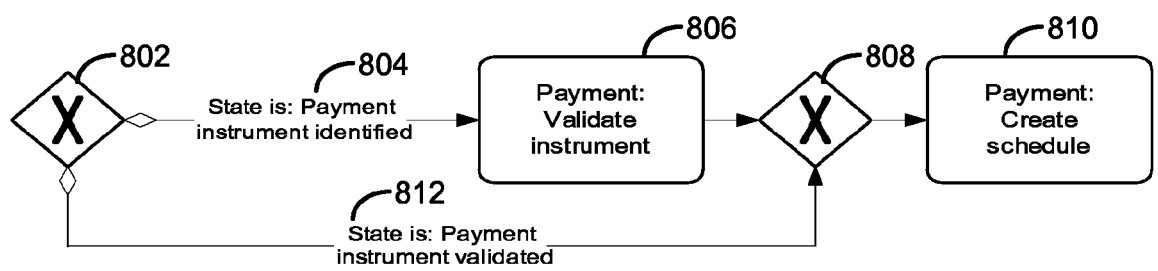
FIG. 8 is a service process fragment used in the system of FIG. 6.

Illustrative, non-limiting examples of such entities are provided in FIG. 8 as a payment entity 108a, a settlement entity 108b, an advertisement entity 108c, and a generic/representative service delivery entity 108d that may represent a number of other possible service delivery functionalities. As described in detail herein, the service registration system 116 may be used to configure the service(s) 104 with one or more of the entities 108a-108d, so as to obtain the registered services 110 and ultimately to obtain the brokered service 112.

In the example service broker 108, the payment entity 108a may generally represent, for example, functionality related to collecting payment from the consumer 106 of the brokered service 112. This may include validating a payment instrument, collecting partial payments over time, cancelling a payment if necessary, and many other payment-related functions. Specific examples related to the payment entity 108a are provided below with respect to FIGS. 3 and 4A.

Meanwhile, the settlement entity 108b may relate to activities associated with executing a final settlement and disposition of the brokered service 112 (e.g., once payment is received or otherwise reaches some pre-determined state). For example, such settlement activities may include actions such as actual delivery/receipt of the brokered service at a specified time, or according to a specified schedule. Settlement also may be related to physical delivery or warehouse management (e.g., when the services 104 are related to provision of physical goods). Specific examples related to the settlement entity 108b are provided below with respect to FIGS. 3 and 4B

The advertisement entity 108c may provide for inclusion of advertising and related activities. These may include actual provision of advertising material, as well as, for example, monitoring or measuring a success of the advertising material (e.g., a number of times that an advertising link is followed), collecting payment from the advertiser, or subsidizing payment from the consumer 106 when the advertisements are included.

As should be apparent from the inclusion of the generic/representative service delivery entity 108d, many other types of service delivery entities may be included in and provided by the service broker 108, some of which are referenced herein. For example, such additional service delivery/management functionality may include calculating rewards for the consumer as part of a customer rewards program, dealing with exceptions through call centers, or any other delivery-related functionality that may facilitate the brokering of the service(s) 104.

In the example of FIG. 1, the service broker 108 is illustrated as including the entities 108a-108d, and as providing (in whole or in part) the service registration system 116. Of course, it will be appreciated that the service broker 108 may include or provide many other (e.g., conventional) functionalities that are not illustrated in FIG. 1 for the sake of clarity and conciseness. For example, the service broker 108 may typically include functionality for publishing/discovering the registered services 104, authorizing access to the registered services 110 to the consumer(s) 106 on an individual basis, and/or executing the mechanics of actually delivering the brokered service 112 to the consumer 106 (e.g., exchanging messages or other data with the consumer 106). Additionally, elements related to the implementation of the entities 108a-108d, such as a payment engine, are not explicitly illustrated in FIG. 1, nor are conventional systems that may be useful in providing or configuring the brokered service 112, such as, for example, some or all of a Customer Relationship Management (CRM) system or Enterprise Resource Planning (ERP) system. Nonetheless, it may be appreciated that these and other elements and functionalities may be used to implement the system 100, as would be apparent to one of skill in the art.

In practice, the service registration system 116 may be exposed or provided using the computing device 114 and a display 118. As should be apparent from the description herein, the computing device 114 actually may represent a plurality of computing devices, e.g., connected by a network, so that the display 118 may represent a corresponding plurality of displays. Thus, there may be many combinations and implementations by which the service registration system 116 may be provided.

To name a first non-limiting example, the computing device 114 may represent a computing device executing all or part of the service broker 108, where the service registration system 116 is then provided over a network to the service provider 102 using the display 118 (in this case, the display 118 may be provided by a separate computing device of the service provider, e.g., at a location of the service provider). For example, the service provider 102 may use a browser to access the service registration system 116 over the Internet to configure the services 104.

In another example, the service broker 108 may be implemented locally in conjunction with both the service registration system 116 and the display 118. In this implementation, the service provider 102 would simply be responsible for providing the services 104, and the service broker 108 would then assume responsibility for executing the service registration system 116 to configure the services 104 and obtain the registered services 110. In yet another example, the service provider 102 may execute essentially all of the service registration system 116, including storing the entities 108a-108d for use in configuring the services 104. Various iterations and combinations of these examples, and other example implementations, are also possible.

In most of the examples provided herein, it is assumed that the service provider 102 uses a local computing device to log-in to the service registration system 116 that is running remotely to the service provider 102, e.g., at a location of the service broker 108, for viewing and utilizing the display 118 (e.g., using a browser or other graphical user interface (GUI) 118d running on the display 118). In these examples, the service provider 102 may be responsible for providing configuration parameters for configuring the services 104, while the service registration system 116 is then responsible for providing configuration options to the service provider 102 and then executing received configuration parameters in a manner that is correct, complete, and consistent. Such an implementation allows the service provider 102 to focus on desired business functionality, while allowing the service broker 108 to specialize in the actual configuration (and ultimate provision of) the registered services 110. In the latter case, it may be appreciated that while FIG. 1 illustrates only the single service provider 102, in general, the service broker 108 may provide brokering to a large number of service providers and may thus provide the service registration system 116 to all such service providers in a more-or-less standard form.

As referenced above, the services 104 may be represented in a model-based environment, i.e., as a workflow process model. FIG. 1 illustrates a simplistic conceptualization of such a process model as a process view 118a in which a service of the services 104 includes linear/sequential activities 120, 122, 124. Of course, as well known and already referenced, such process models may actually be detailed, complex processes having a large number of parallel, looped, iterative, split/joined, alternative or other activities.

Meanwhile, the entities 108a-108d may be implemented using finite state machines, or other state machines (e.g., controller abstract state machines) or similar constructs. As with other state machines, the entities 108a-108d may thus be used to capture/describe possible states and transitions between the states. That is, the state machine(s) allows for the different actions and their allowable execution order to be captured. Then, as described herein, during the configuration of a service of the services 104 deployed into the service broker 108, the different possible operations pertaining to the different entities 108a-108d may be selected and configured in their allowable execution order. In general, a meta-model of such state machines may be summarized as representing a life-cycle(s) of the relevant entity in which the state machine includes a start state, multiple (intermediate) states, at least one end state, and transitions between the states.

The simplified conceptualization of such a state machine in FIG. 1 illustrates a payment entity state machine that includes three states of a start state 123, as well as states 125, 126, and 128, as well as associated transitions t, t1, t2 between the states 123/125, 125/126 and 126/128, as shown. For example, the states 123, 125, 126, 128 may represent a state machine in which, after a start state 123, the state 125 represents a state of "payment instrument validated," while the state 126 may represent a state of "partial payment received" and state 128 may represent an end state of "full payment received." Thus, the transition t in this example may represent a transition between the start state 123 and the state 125 (during which a payment instrument such as a credit card may be validated using one or more corresponding services), while the transition t1 represents a transition between states 125/126, such as may be enacted by one or more services for receiving the partial payment, while the transition t2 may represent one or more services for receiving the full (remainder) payment.

Meanwhile, the display 118 includes a process view 118a that represents at least a portion or fragment of a process model of a particular service of the services 104. Specifically, the process view 118a represents a GUI or GUI portion providing a modeling tool for displaying and/or modifying the service process model. For example, the process view may display activities 120, 122, 124 of the service process model, which may correspond respectively, e.g., to activities such as delivering first and second portions/aspects of a service (120, 122), and then delivering a final portion/functionality of the service (124).

Thus, it may be appreciated from the above that the process view 118a provides a service of the services 104 which the service provider 102 developed without payment ability or other delivery functionalities, but which the service provider 102 may nonetheless wish to provide to the consumer 106. The, in this example, service provider 102 may thus use the display 118 and the service registration system 116 to modify or otherwise configure the process view 118a with activities 120, 122, 124 using the, in this case, payment entity 108a (as well as other entities, not described to the same extent with respect to the example of FIG. 1).

Specifically, a configuration view 118b is illustrated which is designed to provide the user/view of the process view 118a with configuration options for configuring (i.e., registering) the service(s) with the service broker 108. For example, when the service provider 102 attempts to provide the service to the service broker 108, the service provider 102 may access the service registration system 116 to correctly configure the process view.

In FIG. 1 and hereafter, the configuration view 118b may thus illustrate, for example, states 125, 126, and 128 of the payment entity 108a, and may allow the user to 'place' these states within the service process to obtain a brokered service (e.g., the brokered service 112 illustrated in a brokered service process view 118c, as shown) that may be provided to the consumer 106 with a minimum amount of supervision on the part of the service broker 108. For example, the user may select one or more of these 125, 126, 128 states and place them such that the registration system 116 understands that the placed state must be reached at a certain, corresponding part of the execution of the service (process model).

In practice, it may be appreciated that states 125, 126, 128 are, in fact, states of being at a point in time of the (in this case) payment entity 108a, and therefore are not functional in the sense of potentially being included as activities within the service process model. Rather, it is the transitions t, t1, t2 which may represent services or other actions that may be executed as part of the payment entity 108a, and thus ultimately as part of the brokered service 112.

Thus, the brokered service process view 118c illustrates the relevant service (process of services 104) of process view 118a, as modified using the configuration view 118b to obtain the brokered service 112, which itself is based on selection/designation of the states 126, 128 as described herein. The result is the inclusion of entity activities 129/130, 132 (after activity 122 and 124, respectively), where the entity activities are referred to as such to reference their relationship to the payment entity 108a.

For example, as referenced above, the process view 118a may include the activities 120, 122, and 124 associated with successive partial deliveries of the service in question ending in a full/complete delivery with respect to activity 124. As also referenced, the state 126 may represent receipt of a partial payment (transitioned to by transition t1 after validation of a payment instrument in state 125) and the state 128 may represent receipt of payment in full, as executed in association with the transition t2.

In practice, then, the service provider 102 may configure the service in question for brokering/delivery, using the service registration system 116, e.g., by first selecting its corresponding service process model for viewing in the process view 118a, and then selecting (in the example) the activity 124 (as indicated by the solid coloring of that activity). The service registration system 116 may provide configuration options associated with the payment entity and represented by the states 126, 128. The service provider 102 may then designate that the state 126 should be reached as a precondition to beginning the activity 124, and that the state 128 should be reached as a postcondition after completion of the activity 124.

Reaching the state 126 as a precondition to the activity 124 may imply previous reaching of the state 125 earlier in the service process model, so that inserted entity activity 130 may be preceded by an entity activity 129 associated with reaching the state 125 of "payment instrument validated" (e.g., associated with the transition t). In FIG. 1 it may be assumed that the entity activities 129, 130 are inserted together into the brokered service process. However, it is also possible that the entity activity 129 was already created upstream in the process model if the payment instrument was validated earlier (i.e., prior to the overall service process fragment of FIG. 1, such as prior to the activity 120, if the service provider 102 selected the activity 120 as having a precondition of having reached the state 125 of "payment instrument validated"). Thus, in other example implementations, the service provider 102 may select the activities 120, 122 instead of the activity 124, and be provided with, e.g., the same configuration options based on the states 125, 126, 128 (or different configuration options, as may occur, as described herein).

The result of such configurations is that the brokered service (process) ends up as (for practical purposes) a single, seamless, stand-alone service process. That is, even though in this example the service provider 102 concentrates on providing the service itself without payment functionality, the brokered service 112 as shown by a brokered service process model in the brokered service process view 118c may leverage the standardized payment entity 108a and other entities, not shown, to achieve the desired result of commercializing the service including incorporating receipt of payment(s).

In practice, this may include, for example, execution by the service provider 102 of the activities 120, 122, 124, and execution by the service broker 108 of the entity activities 129, 130, 132. For example, a message received from the consumer in response to a message associated with the task 120 may be passed to the service provider 102 for execution, while a message received from the consumer in response to the task 129 may be received and executed on by the service broker 108 to perform the entity activity 130. In this way, again, the service provider 102 and the service broker 108 may execute in their respective realms of expertise.

As referenced above, FIG. 1 provides simplified conceptual examples of workflow (service) process models/views and related state machines of the various entities. In practice, the workflow models and state machines may include lengthy and complex orderings of activities to be considered by the service registration system 116. For example, when the service provider 102 selects a state (e.g., the state 126) from the configuration view 118b as a desired or goal state that should exist as a precondition to a particular activity (e.g., activity 124) of the process view 118a, there may in reality exist a number of possible paths to this desired or goal state within the state machine of the (payment) entity 108a, and the service registration system 116 may be configured to make a selection between the available paths. Further, if the state machine of the payment entity 108a includes optional/conditional branches, it may be difficult or impractical to specify a desired state as a pre or post-condition to an activity in one of the branches, since the relevant branch may never be reached (i.e., if the process follows the other branch).

As another example, the service registration system 116 must guard against human or other error in the configuration of the process view 118a. For example, it may be specified that the payment entity 108a must execute to completion once it is started. In practice, however, the service provider 102 may select the state 126 (partial payment received) as a pre-condition to the activity 124 as already described, but may forget to specify that the state 128 (full payment received) should be reached as a post-condition of the activity 124. This may be unworkable, since it results in partial payment being received and subsequent services being performed, without a following receipt of full payment.

Therefore, the service registration system 116 includes various components and functionalities to guard against these and other problematic eventualities, and otherwise to implement the features described herein. For example, the service registration system 116 may include (or have access to) a view generator 116a, a state manager 116b, a configuration controller 116c, and transition services 116d.

The view generator 116a may represent, except as described otherwise herein, conventional components associated with providing the graphical user interface (GUI) 118d, such as a browser. For example, the view generator 116a may be responsible for providing the views 118a, 118b, 118c and associated components/icons thereof. The view generator 116a also may be responsible for receiving requests, commands, and other inputs from the, e.g., service provider 102 (e.g., such as selecting one or more of the states 125, 126, 128 or other configuration options from the configuration view 118b), and forwarding these to other components of the service registration system 116, as needed.

The state manager 116b may generally be configured to determine state information regarding the entities 108a-108d, particularly as this state information relates to the process view 118a or a selected activity thereof. For example, if the service provider 102 selects the activity 124 for configuration as described above, then the state manager 116b may be configured to determine a corresponding state of the, e.g., payment entity 108a. Corresponding state in this sense generally refers to a state of the payment entity 108a that would be (or would have been) reached at the selected activity if the (brokered) service were currently executing.

For example, in FIG. 1, if no configuration of the service process 118a has yet occurred, then the corresponding state is the start state 123, since this is the state that would be reached first if any of the states 125, 126, 128 were selected with respect to the activity 124. Thus, the service provider 102 may select any of the states 125, 126, 128 as a potential desired or goal state to be reached as a pre- or post-condition of the selected activity 124. However, if the goal state 125 has already been selected as a post-condition of the activity 122 (resulting in placement of the entity activity 129, as shown), then a corresponding state of the activity 124 would be the goal state 125, and then only the goal states 126, 128 may be shown as such to be reached as pre- or post-conditions of the selected activity 124.

A simple example may thus be imagined in which the service provider 102 begins at the beginning of both the service process (view) 118a and the payment entity 108a, at which point virtually all of the available states of the payment entity 108a may be listed as available configuration options or goal states (except when impractical or impossible, e.g., as described herein, such as when parallel branches of the service process and/or payment entity are declared unsuitable for configuration). As the service provider 102 moves through the configuration of the service process view 118a from start to finish (i.e., from relatively earlier to relatively later activities), the available goal states decrease until only an end state(s), such as the end state 128, is available for use as a goal state. Other scenarios are more potentially problematic, such as when the service provider 102 configures relatively earlier activities of the service process after already configuring relatively later activities (which may cause need for re-configuring, as described below, e.g., with respect to FIG. 7A).

For example, in FIG. 1, if the service provider 102 goes back to the activity 120 as the selected activity then the corresponding state of the payment entity 108a would be the start state 123, since at that point in the service process none of the states of the payment entity 108a have been selected as goal states. However, if the service provider now selects the goal state 125 as a post-condition of the activity 120, then the related activity entity 129 to achieve that goal state would have to be reconfigured as a post-condition of the activity 120 instead of as a pre-condition of the activity 122 as illustrated. In practical terms, the service provider 102 would have specified that the state of "payment instrument validated" must be reached as soon as the activity 120 is completed, without waiting for completion of the activity 122 as in the illustrated example.

The configuration controller 116c may be configured, among other responsibilities, to be responsible for using the state information from the state manager 116b to provide such examples of configuring or re-configuring. For example, upon designation/selection of an activity of the service process view 118a, the configuration controller 116c may receive the corresponding state(s) (there may be multiple potential ones of such corresponding states) and calculate the available states that may be used as desired/goal states in the configuration view 118b.

When one of these goal states is selected, then the configuration controller 116c may determine a path(s) through the state machine to get from the corresponding state to the goal state. Although not true of the simplified example of FIG. 1, there may be a plurality of such possible paths, some of which may be more preferable than others, as described herein. The configuration controller 116c may be instrumental in determining an optimal one of these multiple paths, and/or in determining which of the paths is non-preferred or simply unavailable for use in configuration.

Once a path is suggested, the configuration controller 116c may be responsible for providing services to insert as entity activities into the brokered service process view 118c to cause the brokered service process to reach the desired state at the desired time. As referenced above, the inserted entity activities correspond generally/conceptually to the transitions of the payment entity 108a which are responsible for changing the states of the payment entity 108a.

In the simplified example of FIG. 1, there may be a one-to-one correspondence between the transitions t, t1, t2, and entity activities 129, 130, 132. However, in practice there may be a one-to-many or many-to-one relationship between each of the entity activities 129, 130, 132 and the respective transitions t, t1, t2. For example, it may require multiple services to implement the transition t and therefore the entity activity 129 (e.g., it may be necessary to include multiple entity activities 129a . . . 129n).

Conversely, it may be possible to use a single service to implement both of the entity activities 129, 130. This has the potential advantage of accomplishing two goals with a single service. On the other hand, if a later reconfiguring is necessary such that the (function of the) entity activity 129 is specified as occurring after the activity 120, then such reconfiguring may need to include using a first service for the transition t and entity activity 129, and a second service for the transition t1 and the entity activity 130.

The relationships between the (transitions of the) state machine and the inserted/configured entity activities of the brokered service process model in view 118c are described in more detail and with more examples, below. In general, however, it may be appreciated that transition services 116d may be used to implement the transitions t, t1, t2, as the entity activities 129, 130, 132. In practice, this may be as simple as selecting the service that corresponds to a particular transition, or may be as complicated, for example, as composing a large number of services to execute, e.g., a complex transition or a large number of transitions.

A final example operation of the configuration controller 116c is to determine and ensure a completeness and consistency of the brokered service process view 118c. For example, if the service provider 102 selects the activity 124 for configuration and then selects the goal state 126 as a configuration option, and ultimately inserts the entity activities 129/130 as pre-conditions of the activity 124, as shown/described, then the configuration controller 116c may operate to make sure that the service provider 102 is aware that the configuration must continue until the end state 128 of the payment entity 108a is reached. That is, the configuration controller 116c will act to avoid a situation in which partial payment is received and the (brokered) service process is allowed to finish without having received full payment (e.g., without inserting the entity activity 132 corresponding to state 128 and transition t2 for payment in full).

In general, however, each entity should be in one of its final (end) states when the brokered service process execution ends. Thus, the brokered service 112 has to make use of an entity (such as the payment entity 108a) in a way that guarantees reaching a final state on each of the used entities. This ensures that selected configurations for service delivery result in consistent end states being reached when the process completes. In the payment example, when the brokered service 112 ends, i.e., a usage instance of the brokered service 112 comes to an end, all payments should be either finalized and disbursed according to the shared revenue agreed upon by the involved parties, or cancelled and any partial payments reimbursed. Any other usage may be considered incomplete or invalid.

FIG. 1 illustrates thus how the services 104 may be configured and stored as registered services 110 using standard service delivery entities that allow the service provider 102 and the service broker 108 to concentrate in their areas of expertise. Many more examples are possible and would be apparent to one of skill in the art, and some of these examples are provided herein for further explanation and understanding.

Figure 2:
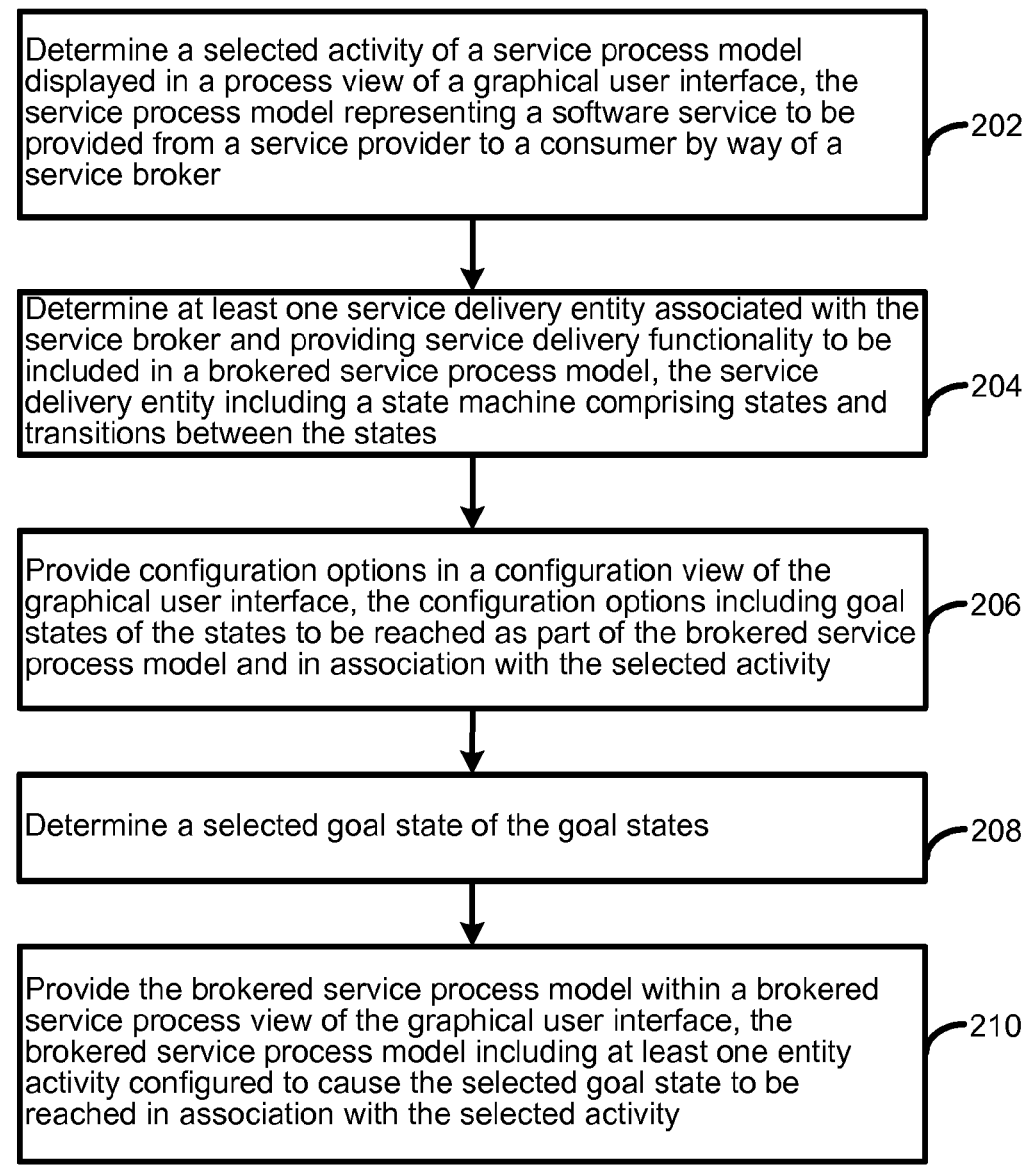
FIG. 2 is a flowchart illustrating example operations of the system of FIG. 1.

FIG. 2 is a flowchart 200 illustrating example operations of the system of FIG. 1. Although FIG. 2 is illustrated sequentially, it may be appreciated that the mere ordering of FIG. 2 in this manner does not necessarily imply that the illustrated order is required, and, in fact, the various operations of FIG. 2 may operate in a different order(s) and/or in an overlapping fashion. For example, as may be appreciated from the above description of FIG. 1, the operations 202 and 204 of FIG. 2 may be reversed in some implementations.

In the example of FIG. 2, a selected activity of a service process model displayed in a process view of a graphical user interface may be determined, the service process model representing a software service to be provided from a service provider to a consumer by way of a service broker (202). For example, the view generator 116a may display the process view 118a in the GUI 118d illustrating the service process model having activities 120, 122, 124 for a particular service of the available services 104. A selected task, such as the selected task 124, may be designated by the service provider 102 (or selected by the service registration system 116) from among the available activities. As described, the service provider 102 (and/or the service broker 108) may then configure the service process model as described herein.

At least one service delivery entity associated with the service broker and providing service delivery functionality to be included in a brokered service process model may be determined, the service delivery entity including a state machine comprising states and transitions between the states (204). For example, the payment entity 108a providing payment functionality may be designated for use in modifying/configuring the service process model of the view 118a, where, as described, the payment entity 108a may include states 123, 125, 126, 128 and transitions t, t1, t2. The payment entity 108a (and any other desired entities or versions thereof) may be selected before, during, or after the selection of the selected activity 124. The configuration controller 116c may make this decision automatically, and/or the view generator 116a may be responsible for receiving user selections or preferences regarding how the payment entity for one or more service delivery functionality is selected.

In some implementations, there may be multiple instances or types of payment entities. For example, there may be a simple payment entity (state machine) for use with some of the services 104, while other services may benefit from being associated with a more comprehensive (and complicated) payment entity. In some implementations, the service provider 102 may be given an option to select a desired one of a plurality of payment entities, and similarly to select from among multiple types or instances of each of the other entities 108b-108d. In other example implementations, the service registration system 116 may be responsible for selecting at least a default payment entity based, e.g., on a number of activities in the service process model (or some other measure of complexity).

Configuration options may be provided in a configuration view of the graphical user interface, the configuration options including goal states of the states to be reached as part of the brokered service process model and in association with the selected activity (206). For example, the view generator 116a may provide the configuration view 118b providing the configuration options including goal states 125, 126, 128 as being available within the payment entity 108 for potential selection with respect to the selected activity 124 (e.g., as a precondition or post-condition thereof). The state manager 116b may be instrumental in determining which of the remaining states of the entity state machine may be available as the goal states.

A selected goal state of the goal states may be determined (208). For example, the view generator 116a may receive a selection of the goal state 126 as the selected goal state.

The brokered service process model may be provided within a brokered service process view of the graphical user interface, the brokered service process model including at least one entity activity configured to cause the selected goal state to be reached in association with the selected activity (210). For example, the brokered service process model may be shown in the view 118c of the GUI 118d, and the configuration controller 116c may be configured to provide (for the selected activity 124) the entity activities 129, 130 associated with transitions t and t1, respectively, so that the goal state 126 is in fact reached as a precondition of the selected activity 124. As described herein, it may occur that a single service may be used to implement both of the entity activities 129, 130, or, conversely, that three or more services are needed to implement both of the entity activities 129, 130.

Figure 3:
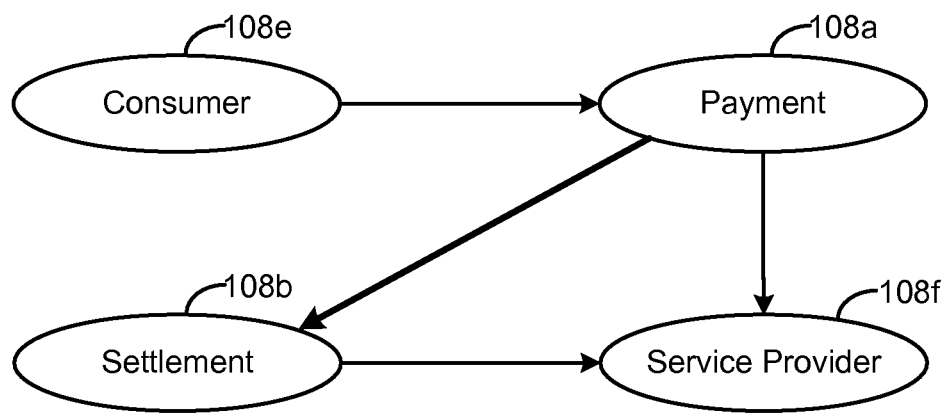
FIG. 3 is a block diagram of example service delivery entities used in the system of FIG. 1.

Continuing this example, the configuration controller 116c, perhaps based on information from the state manager 116b, may determine that the state 126 has been reached but that the state 128 for full payment (i.e., the end state) has not been reached (i.e., has not yet had a corresponding entity activity such as the entity activity 132 provided in the brokered service process model). In other words, the configuration of the service process model in view 118a to reach the brokered service process model in view 118c is not complete, because the brokered service process model of view 118c does not reach an end state (here, state 128) of the payment entity state machine. In some implementations, such a determination may be made by the configuration controller 116c at an end of the configuration/registration process, i.e., when the service provider 102 or other user attempts to finalize the preparation of the brokered service 112. In other example implementations, the configuration controller 116c may use the view generator 116a to provide a warning of the current incompleteness as soon as the first entity activities 129, 130 are provided, in which case the user may either wait to resolve the problem or may immediately attempt to rectify the situation FIG. 3 is a block diagram of example service delivery entities used in the system of FIG. 1. FIG. 3 generally illustrates the proposition that the service delivery entities may be interrelated, e.g., beginning of one entity may depend on partial or total completion of another entity.

Specifically, in FIG. 3, the payment entity 108a and the settlement entity 108b are illustrated, along with a consumer entity 108e and a service provider entity 108f. The consumer entity 108e is the entity that allows Customer Relationship Management (CRM) operations to be configured for the brokered service 112. The service provider entity 108f allows interactions with the service's owner/host (e.g., the service provider 102) to be configured. As already referenced, the payment entity 108a provides for payment and related functionality, while the settlement entity 108b allows the service broker 108 to arrange for various generic settlement actions, such as arranging transportation of goods as part of service fulfillment.

In example implementations described herein, such service delivery entities may be provided by the service broker(s) 108, and may typically be defined if they shape configurations of service delivery (brokering). Reasons for some such entities, such as the payment entity 108a, may be apparent in terms of their utility for service delivery/brokering. Other entities may be included when required by specific circumstances of a brokered service. For example, the service provider entity 108f may be included if various operations with the service provider 102 are to be made explicit, in different parts of the brokered service 112. For example, if the service provider 112 requires notification of certain exceptions, disbursements of funds, and/or feedback for service delivery operations in different parts of the brokered service 112, then it may be advantageous to include functionality of the service provider entity 108f to implement such different operations which can be used in different parts of a process interface.

As referenced above, FIG. 3 illustrates inter-entity dependencies, shown as directed dependencies between the different entities 108a-108f. These dependencies imply that an action, modeled through a state transition, in an entity A can lead to an action in another entity B (shown as A→B). As depicted, for example, it may be seen that the payment entity 108a is dependent on the customer entity 108e because, e.g., it is through the customer that payment actions are triggered. Meanwhile, the settlement entity 108b is dependent on the payment entity 108a, because for some settlement actions to proceed, certain payments actions may be required (specific example(s) provided below with respect to FIGS. 4A and 4B). Actions (i.e., state transitions) in the service provider entity 108f depend on corresponding actions in the payment entity 108a and the settlement entity 108b. Although FIG. 3 illustrates only uni-directional dependencies, other dependencies, e.g., bidirectional dependencies, are also possible.

Figure 4A:
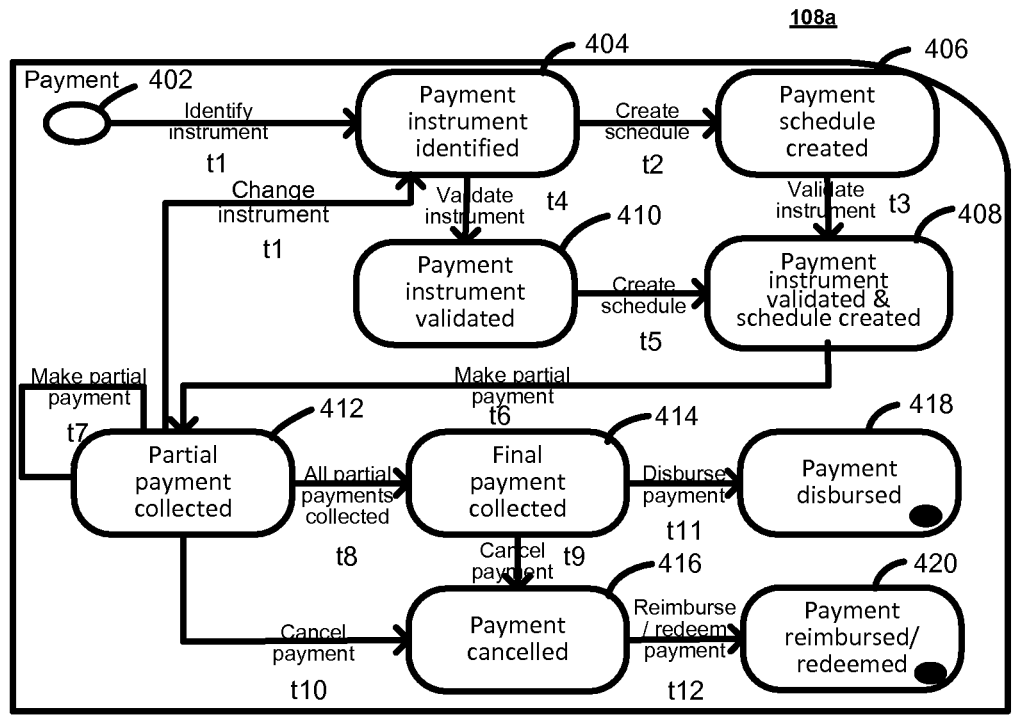
FIG. 4A is a block diagram of a state machine for a payment entity of FIGS. 1 and 3.

FIG. 4A is a block diagram of a state machine for the payment entity 108a of FIGS. 1 and 3. Specifically, as described, FIG. 4A illustrates an example of an entity for payments which governs what payment-related operations can be selected (e.g., as possible goal states) and in what order they need to execute.

FIG. 4A illustrates a start state 402 followed by a transition t1 for identifying the payment instrument, which leads to a state 404 for "payment instrument identified." A transition t2 leads to a state 406 for "payment schedule created" (which may refer to a payment schedule of the consumer 106 and also to apportioning of the payment(s) to the various involved parties, including the service provider 102 and the service broker 108), followed by a transition t3 for validating the payment instrument to arrive at a state 408 in which the payment instrument is validated and the payment schedule has been created. In an alternative branch, a transition t4 may be used to validate the (identified) payment instrument to obtain a state 410 in which the payment instrument is validated, whereupon the payment schedule may be created in a transition t5 and the state 408 thereby reached.

A transition t6 provides for receipt of partial payment, leading to a state 412 in which the partial payment has been collected, which may occur repetitively by way of a transition t7, as shown. A transition t8 in which all partial payments are determined to be collected leads to a state 414 in which the final payment has been collected. Then, a transition t9 may allow for cancellation of the payment leading to a state 416 in which the payment is cancelled, which also may be reached by a "cancel payment" transition t10 from the state 412, as shown. Or, the state 414 may be followed by a transition t11 in which the payment is disbursed and a state 418 of "payment disbursed" is reached as a valid end state (as indicated by the filled circle in the lower-right corner of the state 418). On the other hand, if the payment is in fact cancelled and the state 416 is reached, then a transition t12 for reimbursing/redeeming the payment may lead to a state 420 in which the payment has been reimbursed/redeemed.

Thus, as described, the payment entity 108a governs the possible payment states and an ordering/sequence thereof. For example, it may be apparent that it would be invalid to allow a payment to be collected without the payment instrument first being identified/validated and the payment schedule being set for apportioning collected fees to the service partners.

In the example of FIG. 4A, the payment entity 108a is in exactly one state during execution, and the path on which this state has been reached is not stored (so that the state machine is said to be memoryless, since it does not memorize the path to the state). Therefore, some transitions are present more than once (e.g., transitions t2, t5 for "create schedule"). In contrast in the example, states are unique, i.e., they may only be present once in an entity.

Figure 4B:
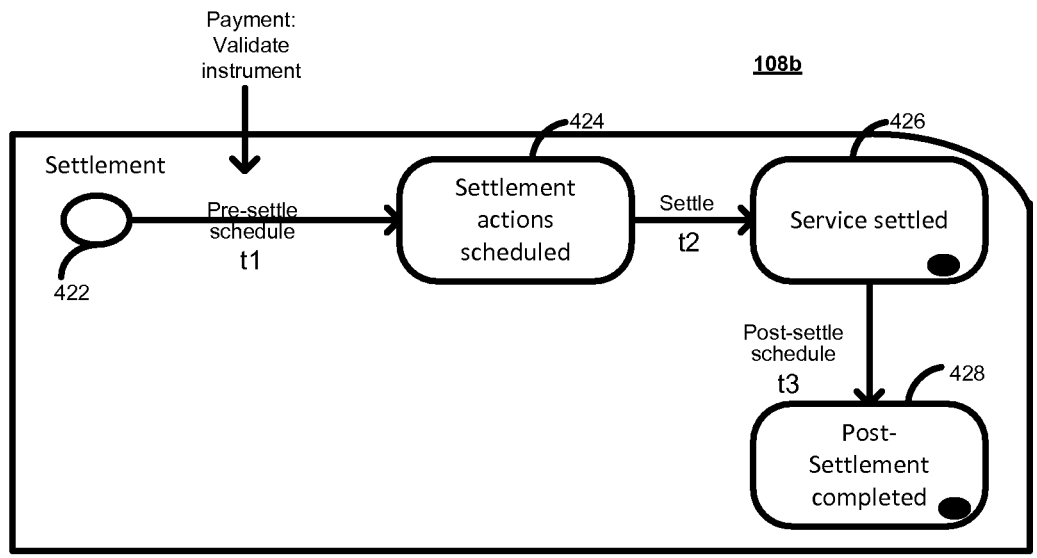
FIG. 4B is a block diagram of a state machine for a settlement entity of FIGS. 1 and 3.

FIG. 4B is a block diagram of a state machine for the settlement entity 108b of FIGS. 1 and 3. As shown, a start state 422 may be altered by a transition t1 for setting a pre-settlement schedule to arrive at a state 424 in which the settlement actions are scheduled. A transition t2 may implement the actual settlement, leading to a state 426 in which the service is settled and at which the settlement entity 108b reaches a valid end state. However, a transition t3 for setting a post-settlement schedule may lead to an option, subsequent (also valid) end state 428 in which post-settlement actions are completed.

Figure 5:
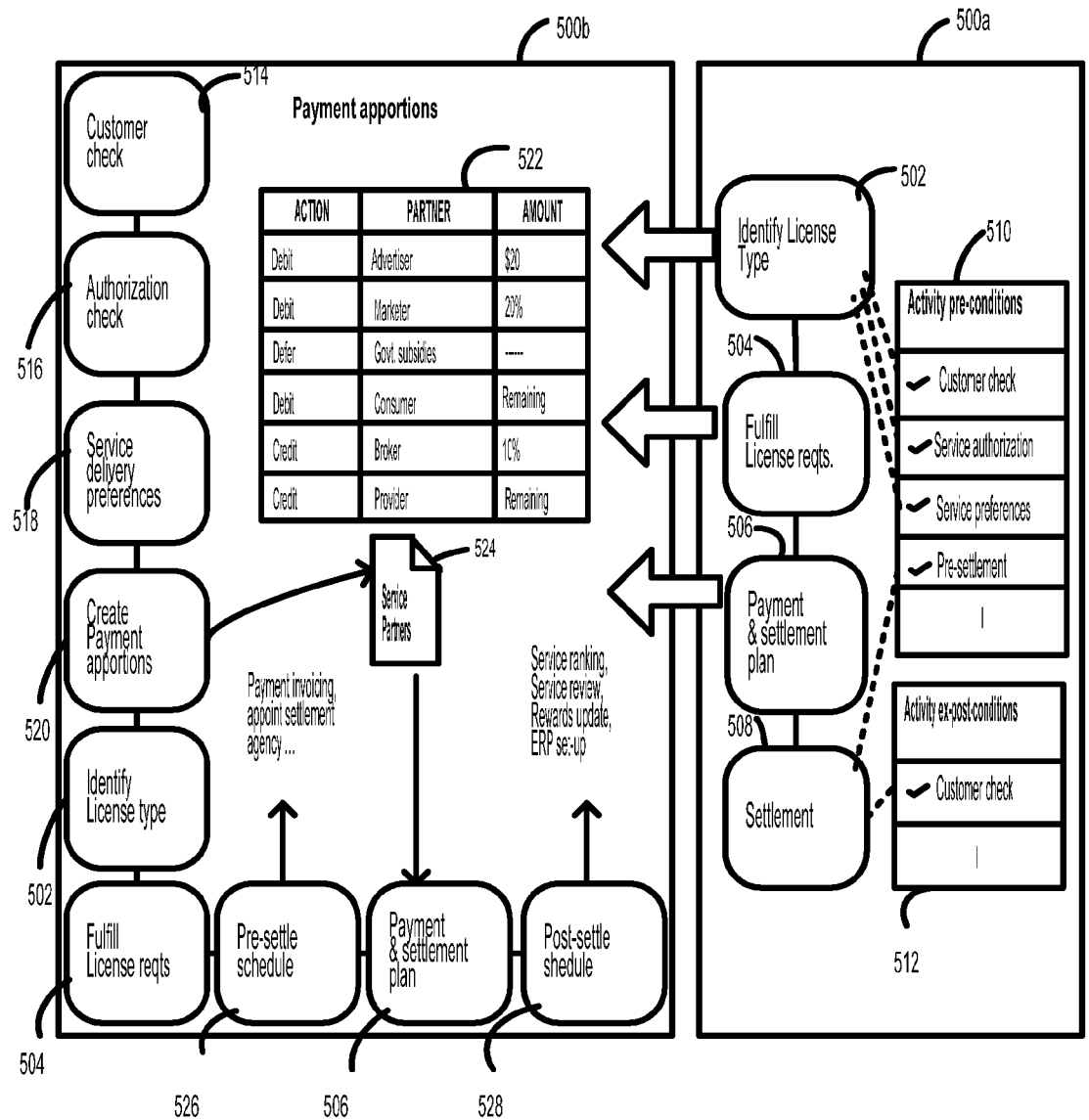
FIG. 5 is a block diagram of a screenshot for configuring a service using the system of FIG. 1.

To illustrate an example of the above-referenced action dependencies between entities it may be seen that FIG. 4B depicts at least a part of the state model for the settlement entity 108b whose action (transition t1) for scheduling pre-settlement actions is dependent on transition t3, t4 in FIG. 4A for validating the payment instrument (i.e., there should be confidence in payment from the consumer in order to schedule settlement actions). Immediate triggering is not assumed or required, but rather it may be appreciated that such dependencies for configuration choices may be contemplated and implemented FIG. 5 is a block diagram of a screenshot for configuring a service using the system of FIG. 1. FIG. 5 illustrates a first portion 500a that represents an example(s) of the process view 118a and the configuration view 118b of FIG. 1, and a second portion 500b that represents an example of the brokered service process view 118c of FIG. 1.

Specifically, elements 502-508 provide an example of the process view 118a of FIG. 1. The specific example is based on brokerage of a service for creation of small businesses. The example involves the identification of the business (license) type in an activity 502, the fulfillment of the requirements to obtain the license(s) in an activity 504, the payment execution and establishment of a settlement plan in an activity 506, and a settlement in an activity 508. In practice, as indicated by the small "+" sign in each of the activities 502-508, the illustrated activities each may in fact represent a collection or aggregation of other activities that collectively provide the stated result(s).

Elements 510 and 512 illustrate an example of the configuration view 118*b*. As described above, such a configuration view illustrates possible goal states of associated service delivery entities 108*a*-108*d* which are being used to register/configure/broker the relevant service. In particular, FIG. 5 illustrates use of (portions of a variation(s) of) the payment entity 108*a*, the settlement entity 108*b*, and the consumer entity 108*e*. Therefore, the configuration view(s) 510, 512 illustrate goal states of these entities in association with selected activities of the available activities 502-508. For example, in FIG. 5, the goal states are illustrated as possible pre-conditions or post-conditions of a selected activity 502 and/or 508, as shown. Although FIG. 5 illustrates an example where the configuration view 118*b* is presented as a pop-up window(s) associated with selected activities, it may be appreciated that virtually any suitable technique may be used (e.g., by the view generator 116*a*) to provide the configuration view 118*b* (e.g., a separate browser pane, or a drop-down menu(s)).

As may be appreciated from the above description, the user (e.g., the service provider 102) may select from among the provided configuration options (e.g., goal states) to obtain the brokered service process model of the view 118*c* of FIG. 1 in the portion 500*b*, as shown. Specifically, entity activities 514-520, 526, 528 (analogous to entity activities 129, 130, 132 of FIG. 1) may be added which correspond to transitions within the payment/settlement/customer (or other) entities used to reach the selected goal states of the configuration options 510, 512.

For example, a customer check entity activity 514 may relate to a service for determining information about a customer (e.g., the consumer 106, perhaps using a CRM application). An authorization check entity activity 516 may correspond to a service authorization goal state in which, e.g., the consumer 106 is determined to be authorized to use the brokered service 112. An entity activity 518 may provide for service delivery preferences (e.g., of the consumer 106) to be accounted for, such as a timing or platform preference(s). An entity activity 520 for creating payment apportions (e.g., between the service provider 102, the service broker 108, and possibly other service delivery partners, such as advertisers, marketers, or government entities) may lead to communication with partners 524 including communication/storage of the payment apportions, e.g., in a table 522. An entity activity 526 relates to execution of a pre-settlement schedule (e.g., payment invoicing or appointment of a settlement agency), while an entity activity 528 relates to execution of a post-settlement schedule (e.g., ranking or reviewing the brokered service 112, updating a customer rewards program, or setting up ERP options).

As may be appreciated, the pre-conditions 510 and post-conditions 512 may correspond to labels of goal states in the state machines of the relevant entities. Selections should abide by the sequencing of related transitions within the state machines, as well as cross-entity dependencies (as described above with respect to FIG. 3).

As described herein, the entity activities such as entity activities 514-520, 526, 528 may be implemented as services and may correspond to transitions of the relevant entities, in a one-to-one, one-to-many, or many-to-one relationship(s). There may be declaratively described services which realize the state transitions, or there may be an explicit representation of the possible realization(s) of a transition. For the latter case, Table 1 illustrates a table of Business Process Modeling Notation (BPMN) activities for a single transition in the settlement entity 108*b*. The relation "All of" here means that all of these activities (e.g., services) are required (in arbitrary order) for the realization of the transition.

TABLE 1

| | Entity state model transition | BPMN activity |
|---|---|---|
| All of | Settlement action | Delivery parts |
| | Settlement action | Exchange documents |
| | Settlement action | Assign lawyer |

Alternatively, there may be services as implementations, with explicit pre and postconditions, such as in Semantic Web service approaches (e.g., the Ontology Web Services Language for Services (OWL-S) or Web Services Modeling Ontology (WSMO)). Thus, in the above example, there may be a service for disbursing payments according to the negotiated apportionments. In terms of the payment entity 108*a*, this service may have the precondition Final payment collected in state 414 of FIG. 4A and the postcondition Payments disbursed of state 418 in FIG. 4A. At the same time, the service may set the status of the service provider entity to service usage disbursed. Thus, it may be appreciated that the services for implementing the entity activities may, for example, span multiple transitions within an entity, and/or may span transitions across entities, as well.

Figure 6:
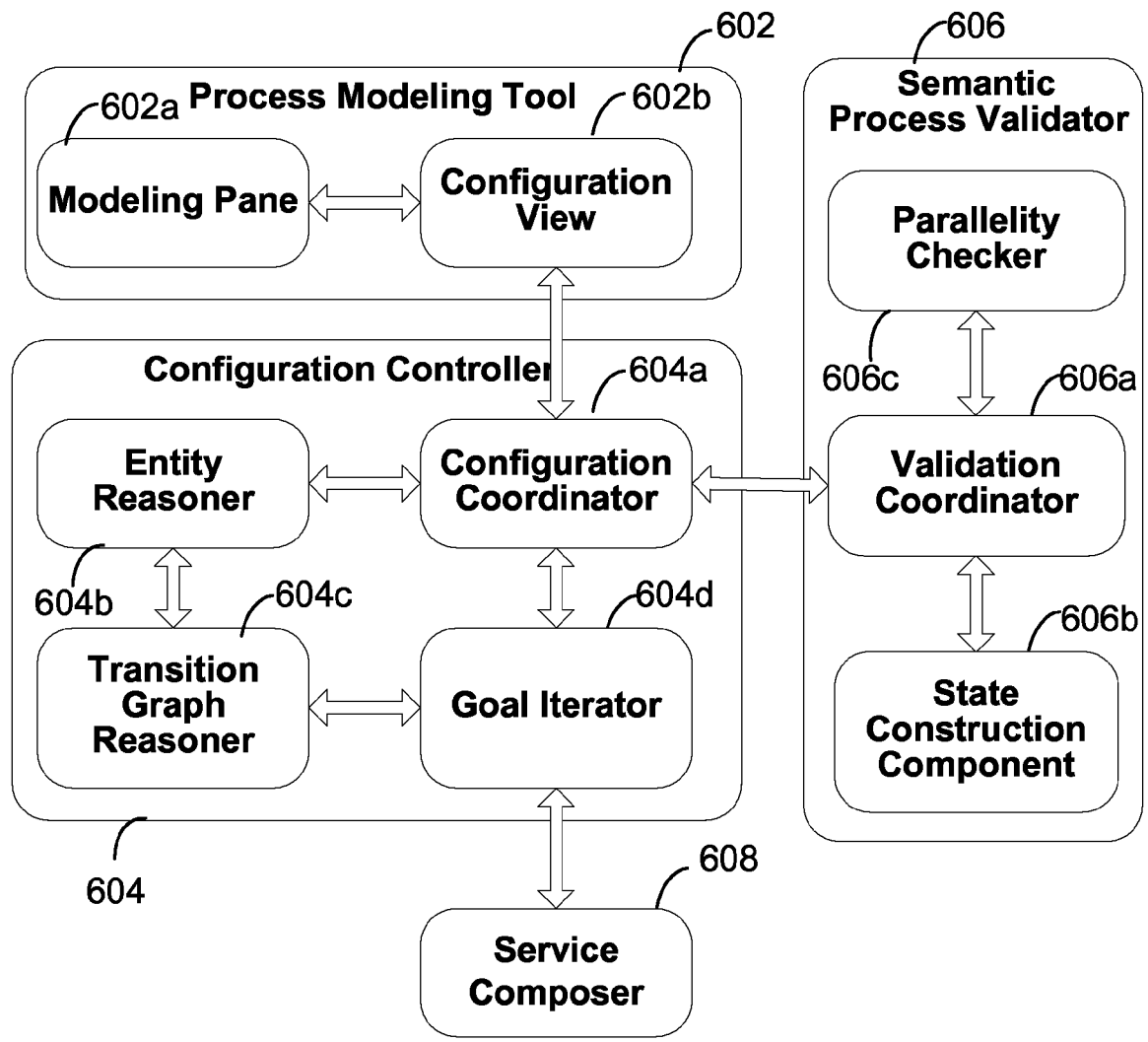
FIG. 6 is a block diagram of an alternate example implementation of the system of FIG. 1.

FIG. 6 is a block diagram of an alternate example implementation of the system of FIG. 1, e.g., of the service registration system 116 of FIG. 1 and related GUI 118*d*. In FIG. 6, a process modeling tool 602 may include a modeling pane 602*a* and a configuration view 602*b*, e.g., as part of a GUI such as the GUI 118*d* of FIG. 1. For example, the modeling pane 602*a* may include or provide the process view 118*a* of FIG. 1 and the brokered service process view 118*c* of FIG. 1, while the configuration view 602*b* may provide the configuration view 118*b* of FIG. 1.

Thus, as may be appreciated from the above description, the process modeling tool 602 may include/provide the relevant GUI(s), and all interaction with the user may be handled by it. The modeling pane 602*a* displays the service process and allows the user (e.g., the service provider 102) to select an activity and trigger further actions. The configuration view 602*b* allows for the configuration-specific interaction with the user, as one example of such further actions. The configuration view 602*b* displays the configuration options, allows the user to trigger the composition of required services to fulfill the requested configuration, and may display the results from which one can be picked, at which point the service process in the modeling pane may be updated (that is, the brokered service process view is provided as an updated version of the original process view, as opposed to a separate version thereof). Further, the configuration view may be used to determine whether the configuration is complete as a consistency check, i.e., if each involved entity will reach a final state when the process ends (for example, so that no payment entity remains in the state "partially paid").

In FIG. 6, a configuration controller conceptually similar to the configuration controller 116*c* of FIG. 1 may be configured, e.g., to provide the configuration view 602*b* and to receive the selection of configuration options therethrough. This may include determining state information regarding the relevant entities, using a semantic process validator 606 as an implementation of the state manager 116b of FIG. 1. The configuration controller 604 also may be configured to examine the state information and the selected configuration options from the configuration view 602b and provide the necessary services for implementing the resulting entity activities to be included within the brokered service process model (e.g., using a service composer 608 as described below). As a final example of operations of the configuration controller 604, the configuration controller 604 may be configured to perform the completeness/consistency checks necessary to ensure, as described that the relevant service delivery entities are ensured of reaching a valid end state(s).

Whether the configuration coordinator 604 is used to execute a determination of configuration options for the selected activity of the service process (e.g., available goal states or selected goal states therefrom from the configuration view), execute a composition of services which fulfill the selected configuration of the selected activity, or perform the completeness check for the whole brokered service process model, as described above, the semantic process validator 606 may be called to determine the corresponding state of each relevant entity with respect to the selected activity of the service process.

Within the configuration controller, a configuration coordinator 604a may serve as a common point of interaction between the configuration view 602b, the semantic process validator 606, and other components of the configuration controller 604. In particular, an entity reasoner 604b may be used to track state information related to each of the different entities involved in a particular configuration (where the state information may be determined in whole or in part for each individual entity by the semantic process validator 606 as described herein). With this information, the entity reasoner 604b may be enabled to find potential corresponding states of each entity (taking into account interdependencies between the entities as described above (e.g., with respect to FIGS. 3 and 4A/4B), as well as possible valid end states. A transition graph reasoner 604c may be used to determine potential valid/usable paths through a given state machine/entity from a corresponding state to one or more selected goal states. A goal iterator 604d may be instrumental in determining the available goal states for configuration and may interact with the service composer 608 and/or the transition graph reasoner 604c to fulfill these.

The transition graph reasoner 604c may be implemented to find, as just referenced, available/possible paths through one or more states machines of one or more entities from a corresponding state of a selected activity to a selected goal state of the relevant state machine. For example, the transition graph reasoner 604c may operate by assigning weights to the transitions in a state machine and then applying a standard graph algorithm (e.g., the Dijkstra algorithm, where, for the corresponding state to a selected activity, the algorithm may be used to determine a path with lowest cost (e.g., the shortest path) to a selected goal state). Thus, a result of these operations is the path from the corresponding state to the desired end (goal) state with the smallest sum of weights of the transitions in the path, where the weights may be used to specify preferences between transitions.

In practice, as just referenced, the service broker 108 or other operator of the configuration controller 604 may implement the transition graph reasoner 604c by assigning weights to the transitions (edges) of the state machines of the various entities. For example, the modeler of the state machine(s) may assign arbitrary positive integer values as weights, (e.g., 1 as a standard case and 2 for less preferred transitions). In some implementations, however, all backward transitions (e.g., transitions such as cancellation or compensation actions for exception or fault handling, where typically such transitions do not lie on the path from the start/corresponding state to the end/goal state) may be assigned a weight larger than the sum of all forward transitions. Formally, for all backward transitions t: $w(t) > \Sigma_{t' \text{ in forward transitions}} w(t')$, where $w(x)$ is the weight of transition x. This implementation results in a strict preference of all forward transitions over any path including a backward transition, since any path will be acyclic (assuming a memoryless nature of the state machines as referenced above), so that any path without a backward transition can at most have a sum of $\Sigma_{t' \text{ in forward transitions}} w(t')$, i.e., if it includes all forward transitions. But since any backward transition has a weight larger than this sum, and since all weights are positive, and assuming the shortest path from the corresponding state to the goal state is selected, then any path without a backward transition becomes strictly preferred over any path with a backward transition.

The semantic process validator 606 may be used to input a semantically annotated process and determine an approximation of the logical state in which a process is at any given stage of execution (performed by a state construction component 606b) and further determine which activities may be executed in parallel to which other activities (peformed by a parallelity checker 606c). As shown, a validation coordinator 606a may be used to control the operation of the functions of the state construction component 608b and the parallelity checker 606c and coordinate provision of this information with the configuration coordinator 604a for a given requested purpose (e.g., to determine which configuration options are available, to determine preconditions and constraint sets for possible goal states; and to perform completeness checking to determine whether all involved entities reach an end state(s) when the service process ends).

To execute these functions, the semantic process validator 606 may be configured to execute various types of propagation through the semantically annotated process models. In this context, semantic annotations of process models are known (e.g., the OWL-S or WSMO for semantic web services). For example, as alluded to above, such annotations may include specification of pre-conditions or post-conditions (also known as effects). Such conditions may include one or more literals (i.e., possibly negated facts) provided by a logical expression, e.g., representing facts which need to be true so that an activity may be executed for a pre-condition, or that are true after execution of the activity in the case of a post-condition.

Further, there exist types of propagation through processes, and their characteristics, which are known and are not discussed here in detail. By way of example, one type of propagation is known as matrix or "M" propagation, which may be used, e.g., by the parallelity checker 606c to propagate parallelism information over the nodes (states) of the entity state machines. More particularly, a matrix may be constructed by starting at a start node and performing propagation steps in an order following available transition numberings, and using nodes whose incoming edges have already been considered and whose outgoing edges (transitions) have not yet been considered. Each propagation step updates the matrix M, which may then be used to determine whether two nodes are parallel by verifying whether their incoming edges/transitions are parallel.

In another example propagation technique, intersections "I" may be determined with which non-executable activities may be detected (e.g., an activity in a branch after a split may be non-executable if the other branch(es) is selected. I-propagation techniques may be used to track sets of literals maintained individually for every edge/transition. In order to detect non-executable nodes (i.e., nodes whose precondition is falsified in at least one execution), the I-propagation technique may provide a summary of all possible paths that may be encountered whenever a node in question is activated. For example, the knowledge may be sufficient of the set of literals that are necessarily true whenever the node's incoming edge carries a token, such that the set of literals corresponds to the intersection of the set of literals at the incoming edge. The ability to determine executability based on these intersections may be advantageous because it may avoid enumerating all possible paths.

A final example of a propagation technique is referred to herein as union or "U" propagation. The U-propagation computes a set of literals, U(e), for every edge e. This set contains each literal that may be true when e is activated (in contrast to a set I(e) in I-propagation above, which contains all literals that must be true). Some symbols are used in Definition 1 below, which are defined thereafter.

Definition 1. Let $\mathcal{G} = (\mathcal{N}, \mathcal{E}, \mathcal{O}, \mathcal{A})$ be a basic annotated process graph with constants C; let M* be the M-propagation result. We define the function $U_0$; $e \mapsto 2^{P[C]} \cup \{\bot\}$ as $U_0(e) = \text{eff}(n_0)$ if $e = \text{OUT}(n_0)$. $U_0(e) = \bot$ otherwise. Let $U, U' : e \mapsto 2^{P[C]} \cup \{\bot\}$, $n \in \mathcal{N}$. We say that U' is the propagation of U at n iff one of the following holds:

1. $n \in \mathcal{N}_{PS} \cup \mathcal{N}_{XS}$, and $U(\text{IN}(n)) \neq \bot$ and for all $e \in \text{OUT}(n)$ we have $U(e) = \bot$ and U' is given by $U'(e) = U(\text{IN}(n))$ if $e \in \text{OUT}(n)$, $U'(e) = U(e)$ otherwise.
2. $n \in \mathcal{N}_{PJ}$, and for all $e \in \text{IN}(n)$ we have $U(e) \neq \bot$, and $U(\text{OUT}(n)) = \bot$, and U' is given by $U'(e) = [\cup_{e' \in \text{IN}(n)} U(e')] \setminus \{l | \neg \in \cup_{e' \in \text{IN}(n)} I(e')\}$ if $e = \text{OUT}(n)$, $U'(e) = U(e)$ otherwise.
3. $n \in \mathcal{N}_{KJ}$, and for all $e \in \text{IN}(n)$ we have $U(e) \neq \bot$, and $U(\text{OUT}(n)) = \bot$, and U' is given by $U'(e) = \cup_{e' \in \text{IN}(n)} U(e')$ if $e = \text{OUT}(n)$, $U'(e) = U(e)$ otherwise.
4. $n \in \mathcal{N}_T$, and $U(\text{IN}(n)) \neq \bot$ and $U(\text{OUT}(n)) = \bot$, and $$U'(e) = \begin{cases} \overline{\text{eff}(n)} \cup L \cup (U(\text{IN}(n)) \setminus \neg \overline{\text{eff}(n)}) & e = \text{OUT}(n) \\ U(e) \cup \overline{\text{eff}(n)} & M *_{\#(\text{IN}(n))}^{\#(e)} = 1 \text{ and } U(e) \neq \bot \\ U(e) & \text{otherwise} \end{cases}$$

where $L = \cup_{n' \in N} \overline{\text{eff}(n')}$ with $N' = \{n' \in \mathcal{N}_T | M *_{\#(\text{IN}(n))}^{\#(\text{IN}(n'))} = 1\}$; if A(n) is not defined then eff(n):=in the above.

If U* results from starting in $U_0$, and stepping on to propagations until no more propagations exist, then U* may be called a U-propagation result.

The following definitions provide definitions for symbols of Definition 1 that are not otherwise apparent. For example, Definition 2 provides a standard definition for a process graph (such as the state machines described herein).

Definition 2. A process graph is a directed graph $\mathcal{G} = (\mathcal{N}, \mathcal{E})$, where $\mathcal{N}$ is the disjoint union of $\{n_0, n_+\}$ (start node, stop node), $\mathcal{N}_T$ (task nodes), $\mathcal{N}_{PS}$ (parallel splits), $\mathcal{N}_{PJ}$ (parallel joins), $\mathcal{N}_{XS}$ (xor splits), and $\mathcal{N}_{XJ}$ (xor joins). For $n \in \mathcal{N}$, IN(n)/OUT(n) denotes the set of incoming/outgoing edges of n. We require that: for each split node n, |IN(n)|=1 and |OUT(n)|>1; for each join node n, |IN(n)|>1 and |OUT(n)|=1; for each $n \in \mathcal{N}_T$, |IN(n)|=1 and |OUT(n)|=1; for $n_0$, |IN(n)|=0 and |OUT(n)|=1 and vice versa for $n_+$; each node $n \in \mathcal{N}$ is on a path from the start to the stop node. If |IN(n)|=1 we identify IN(n) with its single element, and similarly for OUT (n); we denote $\text{OUT}(n_0) = e_0$ and $\text{IN}(n_+) = e_+$.

In Definition 2, an execution of the process starts at n0 and ends at n+; a task node is an atomic action executed by the process; parallel splits open parallel parts of the process; xor splits open alternative parts of the process; joins re-unite parallel/alternative branches.

Formally, the semantics of process graphs is, similarly to Petri Nets, defined as a token-based process, i.e., a state of the process may be represented by tokens on the graph edges. Definition 3 provides a definition of a semantic (annotated) process graph.

Definition 3. Let $\mathcal{G} = (\mathcal{N}, \mathcal{E})$, be a process graph. A state t of $\mathcal{G}$ is a function $t : e \mapsto \mathbb{N}$; we call t a token mapping. The start state $t_0$ is $t_0(e) = 1$ if $e = e_0$, $t_0(e) = 0$ otherwise. Let t and t' be states. We say that there is a transition from t to t' via n, written $t \mapsto^n t'$, iff one of the following holds:

1. $n \in \mathcal{N}_T \cup \mathcal{N}_{PS} \cup \mathcal{N}_{PJ}$ and $t'(e) = t(e) - 1$ if $e \in \text{IN}(n)$, $t'(e) = t(e) + 1$ if $e \in \text{OUT}(n)$, $t'(e) = t(e)$ otherwise.
2. $n \in \mathcal{N}_{XS}$ and there exists $e' \in \text{OUT}(n)$ such that $t'(e) = t(e) - 1$ if $e = \text{IN}(n)$, $t'(e) = t(e) + 1$ if $e = e'$, $t'(e) = t(e)$ otherwise.
3. $n \in \mathcal{N}_{XJ}$ and there exists $e' \in \text{IN}(n)$ such that $t'(e) = t(e) - 1$ if $e = e'$, $t'(e) = t(e) + 1$ if $e = \text{OUT}(n)$, $t'(e) = t(e)$ otherwise.

In Definition 3, an execution path is a transition sequence starting in t0. A state t is reachable if there exists an execution path ending in t. Then, t(e), at any point in time, gives the number of tokens currently at e. Task nodes and parallel splits/joins just take the tokens from their IN edges, and move them to their OUT edges; xor splits select one of their OUT edges; xor joins select one of their IN edges.

For semantic annotations, standard notions from logic may be used, involving logical predicates and constants (the latter correspond to the entities of interest at process execution time). Predicates are denoted with G;H;I and constants with c; d; e. Facts are predicates grounded with constants. Literals, as referenced above, are possibly negated facts. If l is a literal, then ¬l denotes l's opposite Sets L may be identified with their conjunction $\wedge_{l \in L}$. Given a set P of predicates and a set C of constants, P[C] denotes the set of all literals based on P and C; if arbitrary constants are allowed, P[] may be used.

An ontology O may include a pair (P; T) where P is a set of predicates (O's formal terminology) and T is a theory over P (constraining the behavior of the application domain encoded by O). Annotated process graphs are defined in Definition 4:

Definition 4. An annotated process graph is a tuple $\mathcal{G} = (\mathcal{N}, \mathcal{E}, \mathcal{O}, \mathcal{A})$ $(\mathcal{N}, \mathcal{E})$, is a process graph, O=(P,T) is an ontology, and $\mathcal{A}$, the annotation, is a partial function mapping $n \in \mathcal{N}_T \cup \{n_0, n_+\}$ to (pre(n), eff(n)) where pre (n), eff(n) $\subseteq$ P[], and mapping $e \in \text{OUT}(n)$ for a $n \in \mathcal{N}_{XS}$ to (con(e), pos(e)), where con(e) $\subset$ P[] and pos(e) $\in \{1 \ldots, |\text{OUT}(n)|\}$. We require that: there does not exist as n so that $T \wedge \text{eff}(n)$ is unsatisfiable or $T \wedge \text{pre}(n)$ is unsatisfiable; there does not exist an e so that $T \wedge \text{con}(e)$ is unsatisfiable; there do not exist n, e, and e' so that e,e'$\in$OUT(n), $\mathcal{A}$(e) and $\mathcal{A}$(e') are defined, and pos(e)=pos(e').

Cycles in (N; E) may be referred to as loops; pre(n) is referred to as n's precondition; eff(n) as n's effect (i.e., postcondition); con(e) as e's condition, and pos(e) as e's position.

A formal execution semantics for the (annotated) process graphs is provided in Definition 5.

Definition 5. Let $\mathcal{G} = (\mathcal{N}, \mathcal{E}, \mathcal{O}, \mathcal{A})$ be an annotated process graph. Let C be the set of all constants appearing in any of the annotated pre(n), eff(n), con(n). A state s of $\mathcal{G}$ is a pair $(t_s, i_s)$ where t is a token mapping and i is an interpretation $i:P[C] \mapsto \{0,1\}$. A start state $s_0$ is $(t_0, i_0)$ where $t_0$ is as in Definition 3, and $i_0|=T[C]$, and $i_0|=T[C] \wedge \text{eff}(n_0)$ in case $\mathcal{A}(n_0)$ is defined. Let s and s' be states. We say that there is a transition from s to s' via n, written s→"s', if one of the following holds:

1. $n \in \mathcal{N}_{PS} \cup \mathcal{N}_{PJ} \cup \mathcal{N}_{XJ}$, $i_s = i_{s'}$, and $t_s \rightarrow " t_{s'}$ according Definition 3.
2. $n \in \mathcal{N}_{XS}$, $i_s = i_{s'}$, and $t'(e) = t(e) - 1$ if $e \in \text{IN}(n)$, $t'(e) = t(e) + 1$ if $e = e'$, $t'(e) = t(e)$ otherwise, where either $e' \in \text{OUT}(n)$ and $A(e')$ is undefined, or $e' = \text{argmin}\{\text{pos}(e)|e \in \text{OUT}(n), \mathcal{A}(e) \text{ is defined}, i_s|=\text{con}(e)\}$
3. $n \in \mathcal{N}_T \cup \{n_+\}$, $t_s \rightarrow " t_{s'}$ according to Definition 3, and either: $\mathcal{A}(n)$ is undefined and $i_s = i_{s'}$; or $i_{s'}|=\text{pre}(n)$ and $i_{s'} \in \min(i_s, T[C] \wedge \text{eff}(n))$ where $\min(i_s, T[C] \wedge \text{eff}(n))$ is defined to be the set of all i that satisfy $T[C] \wedge \text{eff}(n)$ and that are minimal with respect to the partial order defined by $i_1 \le i_2$ iff $\{p \in P[C]|i_1(p) = i_g(p)\} \supseteq \{p \in P[C]|i_2(p) = i_g(p)\}$.

An execution path is a transition sequence starting in a start state $s_0$. A state s is reachable if there exists an execution path ending in s. Given an annotated process graph (N; E;O;A), the term execution path of (N; E) may refer to an execution over tokens that acts as if A was completely undefined (in which case Definition 5 essentially simplifies to Defition 3).

The part of Definition 5 dealing with $n \in \mathcal{N}_{PS} \cup \mathcal{N}_{PJ} \cup \mathcal{N}_{XJ}$ parallels Definition 3, e.g., the tokens pass as usual, and the interpretation remains unchanged. For $n \in \mathcal{N}_{XS}$, the definition says that an output edge e' is selected where either e' is not annotated, or e' has the smallest position among those edges whose condition is satisfied by the current interpretation, $i_s$. A basic annotated process graph is an acyclic annotated process graph without edge annotations (con(e) and pos(e)).

Finally in FIG. 6, the service composer 608 may be called by the configuration controller 604 to compose services related to implementing the transitions necessary to reach the desired goal state(s). In general, as referenced above, t he configuration controller 604 seeks to locate a path to get from the corresponding state of an entity to a desired/goal state. Since, in general, the entity may be in one of several possible states, this may involve finding multiple paths, i.e., one for each possible state. Then, in one example, the transitions may be directly linked to process activities, and a path in the state machine may be translated into a process part directly. In another example implementation, there are services realizing transitions in the state machine, but their correspondence to transitions is not as well-known or apparent. For example, they may not constitute state transitions for which no transition path exists in the state machine, but they may specify pre- and post-conditions over multiple entities. In either case, a path may be found from the corresponding state (or the set of possible corresponding states) to a desired state, solely by using available means of transition (i.e., transitions relating to process activities or services implementing transitions).

In the latter case, for example, based on a semantic goal, the service composer 608 may attempt to find one or more services, which in combination allow fulfilling the goal state (e.g., from the transition services 116d of FIG. 1, not explicitly shown in FIG. 6). The service composer 608 thus covers the case where transitions in entity state machines are realized by semantically annotated services.

In addition to the use of pre-conditions and post-conditions above, a constraint-set may be defined. The semantics are the following: the preconditions describe under which conditions a service is executable, i.e., if a given state satisfies the preconditions, the service can be executed. If so, the service can be executed, and by applying the postconditions the state after the service execution can be determined. The constraint-set poses constraints on the states that may be produced as intermediate states in a service composition.

Figure 7A:
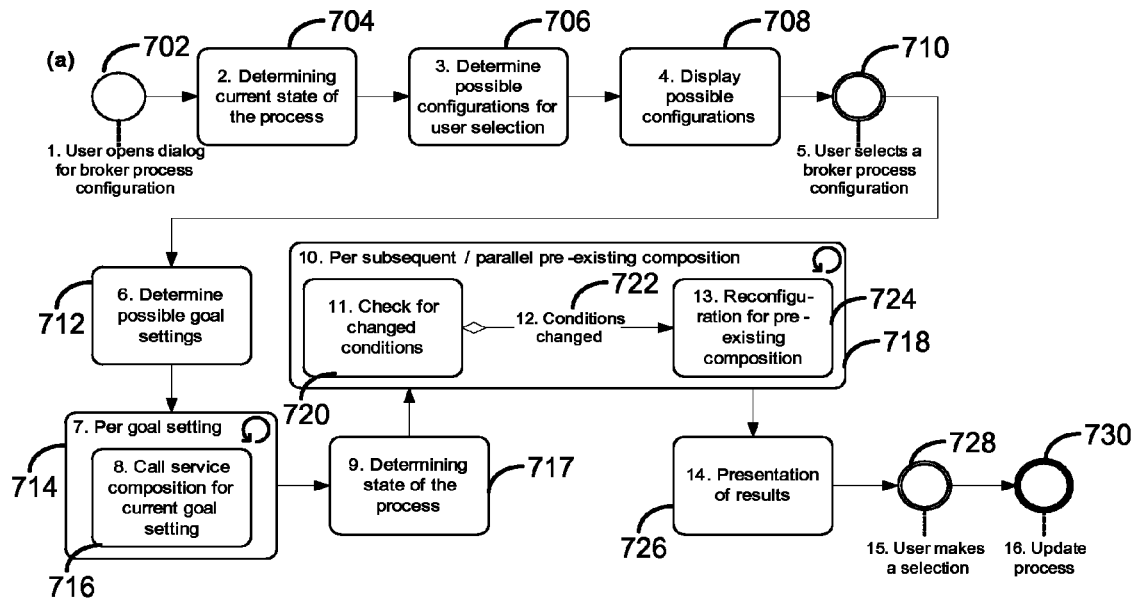
FIG. 7A is a first flowchart illustrating example operations of the system of FIG. 6.
Figure 7B:
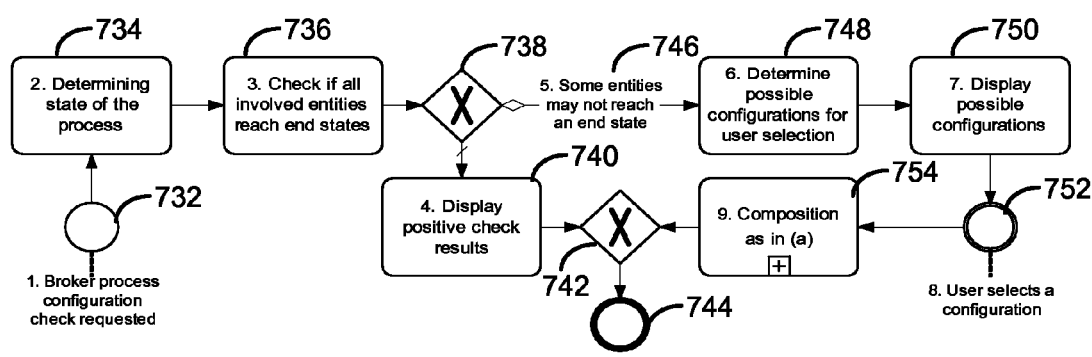
FIG. 7B is a second flowchart illustrating example operations of the system of FIG. 6.

FIG. 7A is a first flowchart illustrating example operations of the system of FIG. 6. Specifically, FIG. 7A is in the Business Process Modeling Notation (BPMN) describing the functionality of an example(s) of how a user may proceed with configuring a service for brokering, including, in the example, an automatic composition of the necessary services to be performed to implement the associated entity activities. That is, as described, the approach of FIG. 7A is to have the user select a point (i.e., a selected activity) in the service process when an entity should reach a specified corresponding state, then to specify which (combined) goal state should be reached, and to use a composition technique to get from the corresponding state to the goal state. In FIGS. 7A and 7B, reference is generally made to FIG. 6 for example implementation(s) of the described functionality; however, it may be appreciated that reference also may be made to the example implementation(s) of FIG. 1, as well, and that the described functionality may be performed using the system of FIG. 1, or analogous systems.

In FIG. 7A, a user may proceed with opening/beginning a dialog for configuration of a service of the services 104. Specifically, the procedure starts with the user selecting an activity (which becomes the selected activity) in the service process at which certain guarantees should hold, e.g., using the modeling pane 602a (702). In order to not configure illegitimate options, the Semantic Process Validator 606 may first determine the corresponding logical state the entity will be in at this point (704), as determined by the states in the life-cycles (of the state machines) of the involved entities which will be active at the selected point of the service process. For example, in the above example of the Payment entity 108a (as shown in FIG. 4A), if there is an activity configured such that "Payment instrument validated & schedule created" will hold, then it may be assumed that this will hold at any point after this activity, unless there is another activity that changes the status of the Payment entity 108a.

From the above description, it may be appreciated that, given optional branches of processes, it may not be possible to determine the exact state in which an entity may be. Instead, a set of states may be determined, any of which the entity may be in. The underlying functionality for such determination(s) may be provided by the I-Propagation techniques referenced above for exact states and by the U-Propagation described above for a set (or union) of possible states. For example, if I-Propagation cannot determine the exact life-cycle state in which an entity will be, then U-Propagation may be used to determine the set of possible states. In other implementations, the I-Propagation may not be used at all. For example, if the U-Propagation returns a set of states in which a given entity may be, then the outcome of I-Propagation would be empty for this entity and therefore not useful. Conversely, if the U-Propagation returns a single state in which a given entity may be, then this result is equal to what the outcome of I-Propagation would provide.

Then, the configurations from which the user may choose are the states in the life-cycles which may be reached from the corresponding state(s) of the selected activity, i.e., the goal states (706). The (reachable) goal states may be determined, for example, by the entity reasoner 604b. Some of these states may be conditional, i.e., can only be reached under the condition that a certain state is active. E.g., in the example of the "payment entity" once "Final payment collected" has been reached, only the states "Payment disbursed," "Payment cancelled," and "Payment reimbursed/ redeemed" may be reached. These options are then presented to the user (708), e.g., using the configuration view 602b.

Once the user selects a configuration (710), the goal iterator 604d may determine all possible goal settings (712), e.g., by using the entity reasoner 604b. For example, if there are multiple states in which the process may be, then these may be separated from one another, and the desired behavior for each of these may be described in a separate semantic goal (e.g., an extended WSMO goal with preconditions, postconditions, and a constraint-set).

Then, for each such goal setting (714), service composition may be invoked (716). Thus, for each of those options, the service composer 608 may be used to create a chain of services that can fulfill the goal(s). These different compositions may then be placed as entity activities in optional process branches at the point of the service process where they need to be positioned, and with the respective condition from the goal setting that lead to this composition. The overall composition may be kept in a container (sub-process) with the semantic goal that led to it, so that possible future updates of the process can trigger re-compositions if these become necessary due to changes in other parts of the process model (as described above with respect to FIG. 1).

In particular, potential re-composition may be considered for all pre-existing compositions which are scheduled subsequently to the activity at hand (expressed in the control flow). E.g., the I-Propagation and U-Propagation may be used to update the states the process may be in (717), as they may have changed due to the newly created composition. That is, the process of state determination in the operation 717 is conceptually similar to that of operation 704, but performed not for a corresponding state of a selected activity, but for up to all of the states of the entity state machine, in order to determine whether reconfiguration is necessary.

Specifically, for each subsequent/parallel pre-existing composition (718) scheduled for execution subsequent or parallel to the currently configured task, a check may be performed whether the conditions for it have changed (720). In other words, the process checks whether the user's relatively later configuration decisions have altered the user's relatively earlier configuration decisions, such as may require re-placement of an already-placed entity activity, and/or re-composition of an already composed service. If so (722), re-composition for the pre-existing composition is triggered (724), where this re-composition can be performed in an analogous way to operations 712-716. In order to avoid frequent re-compositions, as referenced above with respect to FIG. 1, the configuration may be implemented by starting at the beginning of the service process and then following the control flow until reaching the end.

Finally in FIG. 7A, the results are presented to the user (726), e.g., using the modeling pane 602a. After a selection (728), the service process may be updated accordingly as part of the brokered service process (730), as may be provided to the user using the modeling pane 602a.

FIG. 7B is a second flowchart illustrating example operations of the system of FIG. 6. Specifically, for example, FIG. 7B may be used to check whether a service process's usage of the relevant service delivery entities results in reaching of final states of the entities, as required and described above. That is, while the service composition aims at reaching certain goal states of the entities involved in the brokered process at a point of the selected activity, the completeness check makes sure that each entity is in an end state when the brokered service process ends.

In FIG. 7B, when a check of the broker process' configuration is initiated (732), either by explicit request of the user or implicitly in response to a user action/selection, then the semantic process validator 606 may proceed with determining the logical corresponding state at the end of the state machine of the relevant entity (734). Then, the entity reasoner 604b may check whether all involved entities reach one of their end states (736). For example, if there is uncertainty regarding which state will be reached (as discussed above with respect to the user of the I-Propagation and/or U-Propagation techniques), then it is required that each state that may be reached is in fact an end state.

In the case where this is true (738), the user is notified of the positive outcome (740), resulting in a decision (742) to end the process (744). If not (746), a composition of required services is triggered to remedy the situation. In analogy to the above described procedure(s) for FIG. 7A, it first is determined which possible configurations may be selected (748), e.g., using the entity reasoner 604b and the transition graph reasoner 604c as described above with respect to operation 706 of FIG. 7A. These options may then be presented to the user (750), as in operation 708 of FIG. 7A. Once one of the options is chosen (752), composition is performed (754), as described, for example, in operations 712-716 and 726-730 of FIG. 7A. Then, the decision (742) may be made to end the process (744). Thus, FIG. 7B may be viewed as providing a completeness check as described herein, in case of error or omission by the user in terms of ensuring that the end state(s) of the relevant entities will be reached. At the same time, the user may wish to configure only a few selected states of the service process, and then have the brokered service process be further configured in any suitable and appropriate way, without imposing further preferences regarding how the service delivery entities are included. In this context, the operations of FIG. 7B may be considered to be an automated technique to finalize the brokered service 112 in a technical sense, once the user has achieved all desired business goals.

FIG. 8 is a service process fragment used in the system of FIG. 6. Specifically, FIG. 8 provides an example related to the service composition functions of, for example, operations 712-716 of FIG. 7A, in which goal settings are determined and service composition is performed for each goal setting.

For example, with respect to the Payment entity 108a of FIG. 4A, it may occur that the corresponding state for a selected activity is one of multiple possible states, e.g., either Payment instrument identified 404 or Payment instrument validated 410, and the goal state may be Payment instrument validated & schedule created 408. It may be assumed for the sake of example that there are individual services for each of the transitions (e.g., t2-t5). Then, a plan for each of the possible states may be constructed as depicted in FIG. 8. Specifically, as shown, an XOR split 802 may yield a first of two possible scenarios of "state is: payment instrument identified" 804, in which case "payment: validate instrument" activity 806 corresponding to the transition t4 may be executed. In the other branch of the XOR split 802, an outcome of "state is: payment instrument validated" 812 may be reached. An XOR join 808 may combine these two branches to result in the "payment: create schedule" activity 810.

Thus, FIG. 8 illustrates an example in which the process may be in one of multiple possible states (i.e., 404 or 410). If the state is 404, then the XOR join has the effect of implementing t4, 410, t5 to arrive at "payment instrument validated and schedule created" state 408. On the other hand, of the state is 410, then again the same result is obtained of "payment instrument validated and schedule created" state 408. Thus, for example, a selected goal state may be reached even when a corresponding state of the selected activity is difficult or impossible to ascertain with complete certainty.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer system including instructions stored on a non-transitory computer-readable medium and executable by at least one processor implemented in computer hardware, the computer system comprising:
   a view generator configured to cause the at least one processor to:
      provide a service process model including process activities displayed in a process view of a graphical user interface, the service process model representing a software service provided from a service provider to a consumer for purchase of services by way of a service broker configured for facilitating commerce of the services including providing the services as brokered services to the consumer,
      determine a selected activity from the process activities of the service process model for configuration,
      provide configuration options as states in a configuration view of the graphical user interface, the configuration options associated with the states of at least one service delivery entity including a payment entity associated with the service broker that provides service delivery functionality including a payment service provided by the payment entity for inclusion in a brokered service process model, the payment entity including a state machine comprising the states and transitions between the states, the payment entity governs possible payment states of the states and sequence thereof, the states are provided as configuration options in the configuration view include payment goal states of the states to be reached as part of the brokered service process model in association with the selected activity,
      determine a selected payment goal state of the payment goal states, and
      provide the brokered service process model within a brokered service process view of the graphical user interface, the brokered service process model including the process activities of the service process model and at least one payment entity activity of the payment service provided by the payment entity associated with the selected payment goal state of the payment goal states, the at least one payment entity activity being different than the activities of the process activities;
   a state manager configured to cause the at least one processor to:
      determine a corresponding state of the states associated with the selected activity, and
      determine the payment goal states based thereon; and a configuration controller configured to cause the at least one processor to:
      provide the payment goal states to the view generator as part of the configuration options,
      determine the at least one payment entity activity included within the brokered service process model in association with the selected activity, and cause the selected payment goal state to be reached as part of the brokered service process model.

2. The computer system of claim 1 wherein the view generator is configured to determine the selected activity based on a received selection thereof from within the process view.

3. The computer system of claim 1 wherein the view generator is configured to determine the goal state based on a received selection thereof from within the configuration view.

4. The computer system of claim 1, wherein the configuration controller is configured to determine an execution path through the state machine.

5. The computer system of claim 1 wherein the configuration controller is configured to determine the goal states including disallowing potential goal states within the entity model which are unreachable from the corresponding state.

6. The computer system of claim 1 wherein the configuration controller is configured to determine an execution path through the state machine from the corresponding state to the selected goal state, and configured to determine at least one service that is operable to execute at least part of the execution path.

7. The computer system of claim 1 wherein the configuration controller is configured to determine the entity activity for insertion within the service process model to obtain the brokered service process model.

8. The computer system of claim 1 wherein the goal states are provided in the configuration view, and are associated with each selected activity as a pre-condition or post-condition thereof.

9. The computer system of claim 1 wherein the configuration controller is configured to perform a completeness check on the brokered service process model and thereby ensure that at least one valid end-state of the entity will be reached.

10. A computer program product for executing process models, the computer program product being tangibly embodied on a non-transitory computer-readable medium and including executable code that, when executed, is configured to cause at least one data processing apparatus to:
    determine at least one service delivery entity including a payment entity associated with a service broker and providing service delivery functionality including a payment service provided by the payment entity for inclusion in a brokered service process model, the payment entity including a state machine comprising states and transitions between the states, the payment entity governing possible payment states of the states and sequence thereof
    determine a selected activity from process activities of a service process model to be brokered, the service process model representing a software service to be provided from a service provider to a consumer by way of the service broker configured for facilitating commerce of the services including providing the services as brokered services to the consumer;
    determine a corresponding state of the service delivery entity associated with the selected activity;
    determine payment goal states based on the corresponding state;
    determine a selected payment goal state of the payment goal states; and
    provide the brokered service process model including at least one payment entity activity configured to cause the selected payment goal state to be reached in association with the selected activity, the brokered service process model including the process activities of the service process model and the at least one payment entity activity that is different than the activities of the process activities.

11. The computer program product of claim 10 wherein the corresponding state includes a state of the service delivery entity that would exist at a time of execution of the selected activity.

12. The computer program product of claim 10 wherein the service process model and the selected activity thereof are provided within a service process view of a graphical user interface (GUI), and wherein the brokered service process model is provided within a brokered service process view of the GUI.

13. The computer program product of claim 12 wherein the goal states are provided within a configuration view of the GUI.

14. The computer program product of claim 10 wherein the goal states are determined based on which of the states are reachable from the corresponding state within the state machine.

15. The computer program product of claim 10 wherein the service delivery entity includes at least one valid end state, and wherein the executable code, when executed, causes the at least one data processing apparatus to ensure that the service delivery entity reaches the at least one valid end state during execution of the brokered service process model, including the entity activity.

16. A method of executing instructions using at least one processor implemented in computer hardware of a computing device, the method comprising:
    at the computing device, determining a selected activity from process activities of a service process model displayed in a process view of a graphical user interface, the service process model representing a software service to be provided from a service provider to a consumer by way of a service broker configured for facilitating commerce of the services including providing the services as brokered services to the consumer;
    at the computing device, determining at least one service delivery entity including a payment entity associated with a service broker and providing service delivery functionality including a payment service provided by the payment entity for inclusion in a brokered service process model, the payment entity including a state machine comprising states and transitions between the states, the payment entity governing possible payment states of the states and sequence thereof;
    at the computing device, providing configuration options associated with the states in a configuration view of the graphical user interface, the configuration options including payment goal states of the states to be reached as part of the brokered service process model and in association with the selected activity;
    at the computing device, determining a selected payment goal state of the payment goal states; and
    at the computing device, providing the brokered service process model within a brokered service process view of the graphical user interface, the brokered service process model including at least one payment entity activity configured to cause the selected payment goal state to be reached in association with the selected activity, the brokered service process model including the process activities of the service process model and the at least one payment entity activity that is different than the activities of the process activities.

17. The method of claim 16 wherein determining the selected activity includes determining the selected activity based on a received selection of the activity from the service provider from within the process view.

18. The method of claim 16 wherein providing configuration options comprises:
providing the goal states within a configuration view of the GUI and receiving a selection of the selected goal state therefrom.

19. The method of claim 16 wherein providing the brokered service process model includes the entity activity determining the entity activity for insertion within the service process model to obtain the brokered service process model.

20. The method of claim 16 comprising performing a completeness check on the brokered service process model and thereby ensuring that at least one valid end-state of the entity will be reached.

\* \* \* \* \*